US012630455B2

(12) United States Patent
Fournel et al.

(10) Patent No.: US 12,630,455 B2
(45) Date of Patent: May 19, 2026

(54) FORMING TOOLS FOR CONVERTING GLASS TUBES INTO GLASS ARTICLES

(71) Applicant: CORNING INCORPORATED, Corning, NY (US)

(72) Inventors: Olivier Fournel, Yerres (FR); Allan Mark Fredholm, Vulaines sur Seine (FR); Cesar Bravo Huerta, Coslada (ES); Aniello Mario Palumbo, Painted Post, NY (US); Christophe Pierron, Avon (FR); Boris Nikolayevich Tsvetkov, Saint-Petersburg (RU)

(73) Assignee: CORNING INCORPORATED, Corning, NY (US)

( * ) Notice: Subject to any disclaimer, the term of this patent is extended or adjusted under 35 U.S.C. 154(b) by 552 days.

(21) Appl. No.: 17/828,733

(22) Filed: May 31, 2022

(65) Prior Publication Data

US 2022/0388888 A1 Dec. 8, 2022

(30) Foreign Application Priority Data

Jun. 3, 2021 (RU) ................................. 2021115971

(51) Int. Cl.
*C03B 23/045* (2006.01)
*C03B 23/09* (2006.01)
*C03B 40/027* (2006.01)

(52) U.S. Cl.
CPC .......... *C03B 23/045* (2013.01); *C03B 23/092* (2013.01); *C03B 40/027* (2013.01)

(58) Field of Classification Search
CPC ..... C03B 40/027; C03B 23/045; C03B 23/09; C03B 23/00
See application file for complete search history.

(56) References Cited

U.S. PATENT DOCUMENTS 2,266,417 A    12/1941   Eisler
3,424,570 A  *   1/1969   Couquelet ............. C03B 23/112
                                             65/276

(Continued)

FOREIGN PATENT DOCUMENTS

CN       110869327 A     3/2020
DE         1300641     *   8/1969   ............. C03B 40/04

(Continued)

OTHER PUBLICATIONS

U.S. Department of Health and Human Services, Food and Drug Administration, "Guidance for Industry—Container Closure Systems for Packaging Human Drugs and Biologics", May 1999, p. 17 (Year: 1999).*

(Continued)

*Primary Examiner* — Alison L Hindenlang
*Assistant Examiner* — Steven S Lee
(74) *Attorney, Agent, or Firm* — Michael G. Panian

(57) ABSTRACT

A forming tool for use during a process of converting a glass tube into a glass container, includes a base portion comprising a fluid cavity for containing a fluid and an insertion portion extending from the base portion. The insertion portion includes an external surface sized to fit into an opening of the glass tube. In embodiments, the insertion portion comprises a fluid opening extending from an interior surface thereof to the external surface, the fluid opening configured to deliver the fluid from the fluid cavity between the insertion portion and the glass tube. In embodiments, the forming tool comprises a thermally conductive insert extending through the base portion and the insertion portion, the thermally conductive insert extending through the fluid cavity such that the fluid in the fluid cavity regulates a temperature of the thermally conductive insert.

6 Claims, 10 Drawing Sheets

(56) References Cited

U.S. PATENT DOCUMENTS

| | | | |
|---|---|---|---|
| 2003/0106339 A1* | 6/2003 | Kunert | C03B 23/049 |
| | | | 65/169 |
| 2018/0273418 A1* | 9/2018 | Gaylo | C03B 23/099 |
| 2019/0091909 A1* | 3/2019 | Fontaine | B29C 33/04 |
| 2019/0144326 A1* | 5/2019 | Glacki | C03B 23/092 |
| | | | 65/24 |
| 2019/0160788 A1 | 5/2019 | Deneka et al. | |
| 2019/0161380 A1* | 5/2019 | Gaylo | C03B 23/095 |
| 2020/0123038 A1 | 4/2020 | Jud et al. | |
| 2020/0148576 A1 | 5/2020 | Otero et al. | |
| 2020/0354252 A1 | 11/2020 | Tremp et al. | |
| 2020/0354255 A1* | 11/2020 | Gerber | C03B 23/112 |

FOREIGN PATENT DOCUMENTS

| | | | | |
|---|---|---|---|---|
| DE | 1300641 B * | 8/1969 | | C03B 23/08 |
| DE | 10157258 B4 | 11/2006 | | |
| DE | 102018101842 A1 | 8/2019 | | |
| EP | 3459703 A1 * | 3/2019 | | B29C 33/04 |
| FR | 1387852 A | 2/1965 | | |
| WO | 2020/116584 A1 | 6/2020 | | |

OTHER PUBLICATIONS

Donald C. Rennels and Hobart M. Hudson, "Pipe Flow A Practical and Comprehensive Guide", Wiley, 1st edition, 2012, p. 166 (Year: 2012).*

International Search Report and Written Opinion of the International Searching Authority, PCT/US2022/031516; mailed on Aug. 25, 2022, 10 pages; European Patent Office.

* cited by examiner

FORMING TOOLS FOR CONVERTING GLASS TUBES INTO GLASS ARTICLES

CROSS-REFERENCE TO RELATED APPLICATIONS

This application claims the benefit of priority under 35 U.S.C. § 119 of Russian Patent Application Serial No. 2021115971 filed on Jun. 3, 2021, the content of which is relied upon and incorporated herein by reference in its entirety.

FIELD

The present specification generally relates to forming tools for use in converting glass tubes into glass articles.

TECHNICAL BACKGROUND

Glass tubing may be converted into other glass articles. For example, glass tubing may be converted into various glass containers for use in pharmaceutical applications including without limitation, vials, syringes, ampoules, cartridges and other glass articles. The glass tubing may be converted, for example, in converting machines. These converting machines typically reform long glass tube lengths into a plurality of glass articles using steps which include flame working, rotating and stationary tool forming, thermal separation, or score and shock cutoff steps. For example, to rework the shape of a glass tube, one or more heating stations may pre-heat the glass tube to an elevated temperature to facilitate re-forming a portion of the glass tube by contacting the glass tube with one or more forming tools. After being reworked to a desired shape, the reworked portion of the glass tube may be separated from a remainder of the glass tube for further processing into a desired glass article or container.

During the above-described tool forming steps, measures may be taken to prevent defects in the resultant glass articles. For example, prior to reworking the glass tube into a portion of a glass container, a lubricant may be sprayed onto the forming tools to reduce friction between the forming tools and the glass to prevent friction marks and thermal checks in the resulting glass articles. The forming tools may also be allowed to cool between processing glass tubes in order to prevent the lubricant from burning on the surface of the forming tools. Such measures are inefficient because the conversion process is paused to allow for lubricant application and/or cooling. If the forming tools are not sufficiently cooled, the lubricant sprayed onto the forming tools may burn, leading to carbon layer formation and subsequent shape irregularities in the forming tools. Moreover, if an insufficient volume of lubricant is applied to the forming tools, excessive friction may result in defects in the glass tube.

SUMMARY

Accordingly, a need exists for improved methods of applying lubricant to forming tools and regulating the temperature of the forming tools during the process of converting a glass tube into a glass article.

A first aspect of the present disclosure includes a forming tool for use during a process of converting a glass tube into a glass container. The forming tool comprises a base portion comprising a fluid cavity for containing a fluid; and an insertion portion extending from the base portion, the insertion portion comprising an external surface sized to fit into an opening of the glass tube. In embodiments, the insertion portion comprises a fluid opening extending from an interior surface thereof to the external surface, the fluid opening configured to deliver the fluid from the fluid cavity between the insertion portion and the glass tube. In embodiments, the forming tool comprises a thermally conductive insert extending through the base portion and the insertion portion, the thermally conductive insert comprising a thermal conductivity that is greater than that of a material out of which the insertion portion is formed, the thermally conductive insert extending through the fluid cavity such that the fluid in the fluid cavity regulates a temperature of the thermally conductive insert.

A second aspect of the present disclosure includes a forming tool according to the first aspect, wherein: the insertion portion comprises the fluid opening extending from the interior surface to the external surface; and the fluid comprises a lubricant forming a film between the insertion portion and the glass tube.

A third aspect of the present disclosure includes a forming tool according to any of the first through the second aspects, wherein the fluid opening comprises at least one discrete hole extending between the internal and external surfaces.

A fourth aspect of the present disclosure includes a forming tool according to any of the first through the third aspects, wherein the insertion portion comprises an array of discrete holes.

A fifth aspect of the present disclosure includes a forming tool according to any of the first through the fourth aspects, wherein the array of discrete holes comprises a plurality of rows of discrete holes extending around at least a portion of a circumference of the insertion portion.

A sixth aspect of the present disclosure includes a forming tool according to any of the first through the fifth aspects, wherein the fluid opening comprises a flow path resulting from a porosity of the material out of which the insertion portion is formed.

A seventh aspect of the present disclosure includes a forming tool according to any of the first through the sixth aspects, wherein the material out of which the insertion portion is formed is graphite.

An eighth aspect of the present disclosure includes a forming tool according to any of the first through the seventh aspects, wherein the material out of which the insertion portion is formed is selected from the group consisting of sintered steel, stainless steel, and brass.

A ninth aspect of the present disclosure includes a forming tool according to any of the first through the eighth aspects, further comprising a pressurized lubricant source in fluid communication with the fluid cavity, the pressurized lubricant source configured to deliver a predetermined volume of the lubricant to the fluid cavity over a forming interval in which the glass tube is in contact with the forming tool.

A tenth aspect of the present disclosure includes a forming tool according to any of the first through the ninth aspects, wherein the lubricant comprises an oil or an air-oil mixture.

An eleventh aspect of the present disclosure includes a forming tool according to any of the first through the tenth aspects, wherein: the forming tool comprises the thermally conductive insert extending through the base portion and the insertion portion; the fluid comprises a coolant circulating through the fluid cavity; and the forming tool further comprises: a coolant source; a coolant inlet in fluid communication with the coolant source and the fluid cavity; and a coolant outlet, wherein coolant from the coolant source enters fluid cavity via the coolant inlet, circulates around the thermally conductive insert, and exits the forming tool via the coolant outlet to remove heat from the forming tool.

A twelfth aspect of the present disclosure includes a forming tool according to any of the first through the eleventh aspects, wherein: the heat conductive insert comprises a proximal end disposed in the insertion portion and a distal end disposed in the base portion, and the fluid chamber extends around the distal end such that the coolant circulates around the distal end and at least a portion of a central region of the heat conductive insert extending between the proximal end and the distal end.

A thirteenth aspect of the present disclosure includes a forming tool according to any of the first through the twelfth aspects, wherein a central axis of the forming tool extends through at least a portion of the thermally conductive insert.

A fourteenth aspect of the present disclosure includes a forming tool according to any of the first through the thirteenth aspects, wherein the thermally conductive insert comprises a linear portion extending through the insertion portion and a coiled portion disposed in the base portion.

A fifteenth aspect of the present disclosure includes a forming tool according to any of the first through the fourteenth aspects, wherein an entirety of the thermally conductive insert extends along the central axis of the forming tool.

A sixteenth aspect of the present disclosure includes a forming tool according to any of the first through the fifteenth aspects, wherein the thermally conductive insert comprises a heat pipe.

A seventeenth aspect of the present disclosure includes a forming tool according to any of the first through the sixteenth aspects, wherein the thermally conductive insert is constructed of copper, graphite, or a combination thereof.

An eighteenth aspect of the present disclosure includes a forming tool according to any of the first through the seventeenth aspects, wherein the coolant comprises water.

A nineteenth aspect of the present disclosure includes an apparatus for converting a glass tube into a glass container, the apparatus comprising: a forming station comprising a holder configured to removably secure the glass container; a drive mechanism operatively coupled to the holder, the drive mechanism configured to rotate the glass tube about a holder axis; a first forming tool positioned to contact an external surface of the glass tube when placed in a forming position; and a second forming tool configured for insertion into an opening of the glass tube, wherein, when the first forming tool is in the forming position, the glass tube is pressed between the first and second forming tools and the drive mechanism rotates the holder such that the glass tube rotates as the glass tube is pressed between the first and second forming tools to form a portion of the glass container extending around a circumference of the glass tube, wherein the second forming tool comprises: a base portion, the base portion comprising a fluid cavity; and an insertion portion extending from the base portion, the insertion portion comprising an external surface sized to fit into the opening of the glass tube, wherein at least one of: the insertion portion comprises a fluid opening extending from an interior surface thereof to the external surface, the fluid opening configured to deliver fluid from the fluid cavity between the insertion portion and the glass tube during the rotation thereof; and the second forming tool comprises a thermally conductive insert comprising a thermal conductivity that is greater than that of a material out of which a main body of the insertion portion is formed, the thermally conductive insert extending through the fluid cavity such that fluid in the fluid cavity regulates a temperature of the thermally conductive insert.

A twentieth aspect of the present disclosure includes an apparatus according to the nineteenth aspect, wherein: the forming station is disposed on a base; the apparatus further comprises a main turret that is rotatable about a central axis relative to the base; and the holder is attached to the main turret such that rotation of the main turret positions the glass tube in alignment with the forming station.

A twenty first aspect of the present disclosure includes an apparatus according to any of the nineteenth through the twentieth aspects, further comprising a plurality of processing stations disposed on the base, the plurality of processing stations arranged in a main circuit comprising a heating station heating the glass tube prior to the glass tube entering the forming station.

A twenty second aspect of the present disclosure includes an apparatus according to any of the nineteenth through the twenty first aspects, wherein the plurality of processing stations comprises a second forming station positioned in the main circuit after the forming station, the second forming station comprising a third forming tool sized for insertion into the opening of the glass tube, wherein a tolerance between an external surface of the third forming tool and the opening of the glass tube is less than a tolerance between the external surface of the second forming tool and the opening of the glass tube.

A twenty third aspect of the present disclosure includes an apparatus according to any of the nineteenth through the twenty second aspects, wherein: the insertion portion comprises the fluid opening extending from the interior surface to the external surface; and the fluid comprises a lubricant forming a film between the insertion portion and the glass tube as the glass tube rotates relative to the insertion portion.

A twenty fourth aspect of the present disclosure includes an apparatus according to any of the nineteenth through the twenty third aspects, wherein the fluid opening comprises one or more discrete holes extending between the internal and external surfaces.

A twenty fifth aspect of the present disclosure includes an apparatus according to any of the nineteenth through the twenty fourth aspects, wherein the fluid opening comprises a flow path resulting from a porosity of the material out of which the insertion portion is formed.

A twenty sixth aspect of the present disclosure includes an apparatus according to any of the nineteenth through the twenty fifth aspects, further comprising a pressurized lubricant source in fluid communication with the fluid cavity, the pressurized lubricant source configured to deliver a predetermined volume of the lubricant to the fluid cavity during a forming interval in which the glass tube is in the forming station.

A twenty seventh aspect of the present disclosure includes an apparatus according to any of the nineteenth through the twenty sixth aspects, wherein: the second forming tool comprises the thermally conductive insert extending through the base portion and the insertion portion; the fluid comprises a coolant circulating through the fluid cavity; and the second forming tool further comprises: a coolant source; a coolant inlet in fluid communication with the coolant source and the fluid cavity; and a coolant outlet, wherein coolant from the coolant source enters fluid cavity via the coolant inlet, circulates around the thermally conductive insert, and exits the forming tool via the coolant outlet to remove heat from the forming tool.

A twenty eighth aspect of the present disclosure includes an apparatus according to any of the nineteenth through the twenty seventh aspects, wherein: the heat conductive insert comprises a proximal end disposed in the insertion portion and a distal end disposed in the base portion; and the fluid chamber extends around the distal end such that the coolant circulates around the distal end and at least a portion of a central region of the heat conductive insert extending between the proximal end and the distal end.

A twenty ninth aspect of the present disclosure includes an apparatus according to any of the nineteenth through the eighth aspects, wherein a central axis of the second forming tool extends through at least a portion of the thermally conductive insert.

A thirtieth aspect of the present disclosure includes an apparatus according to any of the nineteenth through the twentieth aspects, wherein the thermally conductive insert comprises a linear portion extending through the insertion portion and a coiled portion disposed in the base portion.

A thirty first aspect of the present disclosure includes an apparatus according to any of the nineteenth through the thirtieth aspects, wherein the thermally conductive insert comprises a heat pipe.

A thirty second aspect of the present disclosure includes an apparatus according to any of the nineteenth through the thirty first aspects, wherein the thermally conductive insert is constructed of copper, graphite, or a combination thereof.

A thirty third aspect of the present disclosure includes a method of converting a glass tube into a glass container, the method comprising: heating the glass tube to an elevated temperature; and shaping the heated glass tube to form a portion of the glass container, the shaping comprising: contacting a portion of an external surface of the glass tube with a first forming tool; inserting a second forming tool into an opening of the glass tube such that a wall thickness of the glass tube is disposed between the first forming tool and the second forming tool, wherein the second forming tool comprises a fluid cavity, and circulating fluid through the fluid cavity while the second forming tool is inserted into the opening such that at least one of: the fluid is ejected from a fluid opening in the second forming tool into a space between the second forming tool and the glass tube, and the fluid circulates around a thermally conductive insert extending through the second forming tool.

A thirty fourth aspect of the present disclosure includes a method according to the thirty second aspect, wherein the shaping of the heated glass tube comprises rotating the glass tube about an axis while the wall thickness of the glass tube is disposed between the first and second forming tools.

A thirty fifth aspect of the present disclosure includes a method according to any of the thirty third through the thirty fourth aspects, wherein: the fluid is ejected from the fluid opening during the circulating of the fluid through the cavity; the fluid is a lubricant; and the circulating of the fluid through the cavity comprises providing a fixed volume of the lubricant to the fluid cavity at a predetermined pressure while the second forming tool is inserted into the opening and rotating in order to form a lubricant layer disposed between the second forming tool and the glass tube.

A thirty sixth aspect of the present disclosure includes a method according to any of the thirty third through the thirty fifth aspects, wherein the lubricant comprises an oil or an air-oil mixture.

A thirty seventh aspect of the present disclosure includes a method according to any of the thirty third through the thirty sixth aspects, wherein the fluid opening comprises one or more discrete holes extending between the internal and external surfaces.

A thirty eighth aspect of the present disclosure includes a method according to any of the thirty third through the thirty seventh aspects, wherein the fluid opening comprises a flow path resulting from a porosity of the material out of which the second forming tool is formed.

A thirty ninth aspect of the present disclosure includes a method according to any of the thirty third through the thirty eighth aspects, wherein: the fluid circulates around the thermally conductive insert; the fluid comprises a coolant; and the circulating of the fluid through the cavity comprises: providing the coolant from a coolant source into the fluid cavity via a coolant inlet in fluid communication with the fluid cavity; and after the coolant circulates around the thermally conductive insert, ejecting the fluid from the fluid cavity via a coolant outlet in fluid communication with the fluid cavity to carry heat from the glass tube away from the second forming tool.

A fortieth aspect of the present disclosure includes a method according to any of the thirty third through the thirty ninth aspects, wherein the coolant comprises water.

A forty first aspect of the present disclosure includes a method according to any of the thirty third through the fortieth aspects, wherein the thermally conductive insert is constructed from a material comprising a higher thermal conductivity than a material out of which a main body of the second forming tool is constructed.

A forty second aspect of the present disclosure includes a method according to any of the thirty third through the forty first aspects, wherein the thermally conductive insert is a heat pipe.

A forty third aspect of the present disclosure includes a method according to any of the thirty third through the forty third aspects, wherein the thermally conductive insert is constructed of copper, graphite, or a combination thereof.

A forty fourth aspect of the present disclosure includes a method according to any of the thirty third through the forty second aspects, wherein the portion of the glass container formed via the first and second forming tools comprises a flange.

A forty fifth aspect of the present disclosure includes a method according to any of the thirty third through the forty fourth aspects, further comprising, after forming the portion of the glass container, inserting a third forming tool into the opening of the glass container, wherein the third forming tool comprises a size that more closely approximates a size of the opening of the glass tube than the second forming tool.

A forty sixth aspect of the present disclosure includes a method according to any of the thirty third through the forty fifth aspects, further comprising, after forming the portion of the glass container, separating the portion of the glass container from a remaining portion of the glass tube by contacting the a region of glass tube with a separating device.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure, in which.

DETAILED DESCRIPTION

Figure 1:
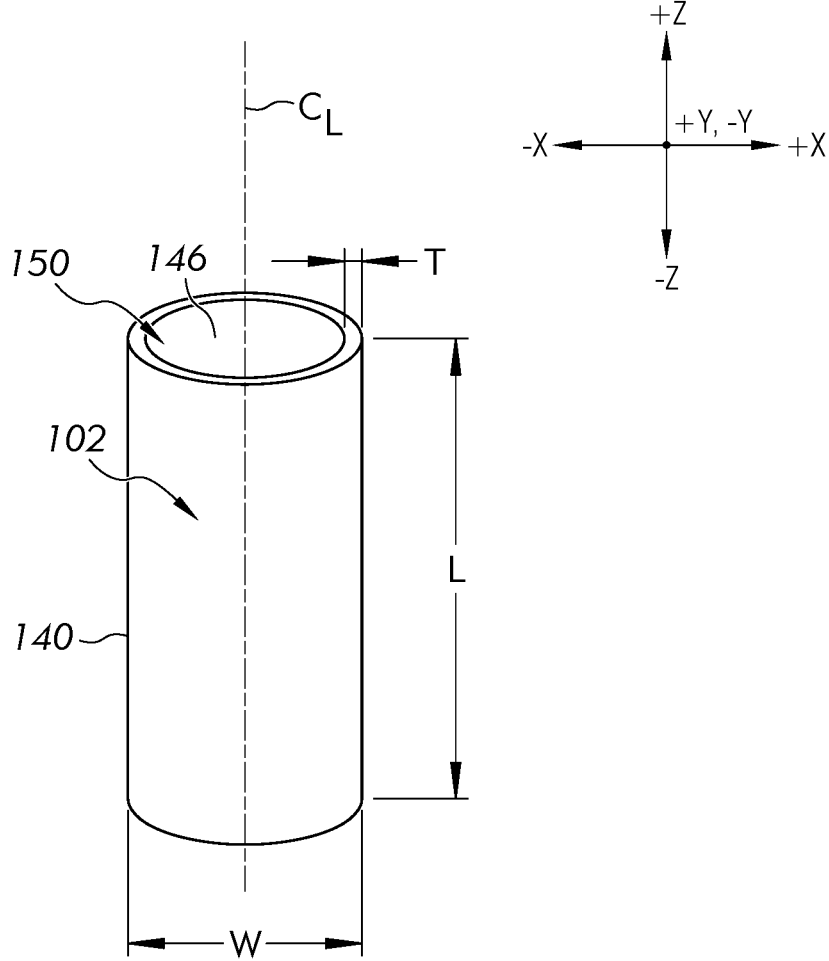
FIG. 1 schematically depicts a glass tube that may be converted into a glass article, according to one or more embodiments described herein.

Reference will now be made in detail to embodiments of temperature-regulated forming tools for use in converting glass tubes into glass articles. Whenever possible, the same reference numerals will be used throughout the drawings to refer to the same or like parts. The forming tools described herein may be sized for insertion into openings of glass tubes in the process of shaping the glass tubes into portions of glass articles. In embodiments, for example, the forming tools described herein comprise a base portion and an insertion portion extending from the base portion. The insertion portion comprises an external surface that is sized to fit into an opening of a glass tube such that the glass tube may be pressed between the forming tool and other forming tools disposed externally to the glass tube. Various aspects of the forming tools described herein are designed to provide adequate lubrication and/or cooling during a process of shaping the glass tube into a glass article. For example, the forming tools described herein may include a fluid cavity in fluid communication with an external fluid source. Fluid may circulate through the base portion and/or insertion portion to facilitate cooling and/or lubrication thereof prior to, during, and/or after the forming tool contacts the glass tube during a process of converting the glass tube into a glass article.

In embodiments, for example, the fluid cavity extends into the insertion portion that is inserted into the opening of the glass tube. In such embodiments, the fluid cavity may be in fluid communication with a lubricant source configured to provide lubricant to the forming tool while the forming tool is being used to reshape the glass tube. The insertion portion of the forming tool may include one or more fluid openings extending between an interior surface (e.g., defining the fluid cavity) thereof and the external surface to provide a layer of lubricant extending between the forming tool and the glass tube as the glass tube moves relative to the forming tool. Via the fluid cavity described herein, lubricant may be locally applied between the forming tool and the glass tube, thereby eliminating the need to spray lubricant onto the forming tool. Applying lubricant via the forming tool as described herein facilitates precise control of the amount of lubricant provided during a reforming step, ensuring an adequate lubricant supply to avoid excessive friction between the forming tool and the glass tube. Moreover, by avoiding the spraying associated with existing lubrication methods, the forming tools described herein improve the cleanliness of the conversion process by avoiding lubricant being applied to other components. Such localized lubrication application may also increase the production rate of glass containers by eliminating the need for down-times to re-oil the forming tool between successive glass tubes.

In embodiments, the forming tools described herein further comprise a thermally conductive insert extending through the insertion portion. The thermally conductive insert is configured to dissipate heat received by the forming tool from the glass tube. For example, in embodiments, the thermally conductive insert comprises a heat pipe and heat from the glass tube evaporates a working fluid disposed in the heat pipe. The evaporated working fluid may traverse the heat pipe to a cooled region and subsequently condense and releases latent heat to regulate the temperature of the thermally conductive insert. In embodiments, the thermally conductive insert is constructed of a material having a higher thermal conductivity than that out of which a main body of the insertion portion is formed to facilitate dissipating heat at the interface between the forming tool and the glass tube. At least a portion of the thermally conductive insert may extend through the fluid cavity in the base portion. Coolant may be circulated through the fluid cavity to cool the thermally conductive insert and dissipate heat received from the glass tube. Such heat dissipation provided by the combination of the coolant and thermally conductive insert may keep the forming tool within a suitable temperature range while in contact with the glass tube, avoiding burning lubricant disposed on the forming tool and potential defects in the resultant glass articles.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, a portion of a glass tube 102 is schematically depicted. The glass tube 102 may be converted into a glass article (or a plurality thereof) in accordance with the methods described herein (e.g., via the converter 100 described with respect to FIGS. 2-4D). As depicted in FIG. 1, the glass tube 102 comprises an exterior surface 140, an interior surface 146, and a wall thickness T extending between the interior surface 146 and the exterior surface 140. In embodiments, the wall thickness is less than or equal to 6 mm (e.g., greater than or equal to 0.1 mm and less than or equal to 6 mm). The interior surface 146 defines an opening 150 in the glass tube 102. The glass tube 102 may be constructed of a variety of different compositions of glass depending on the implementation. In embodiments, the glass tube 102 comprises laminated glass tubing including a plurality of glass layers (e.g., a core layer and a plurality of clad layers). The glass tube 102 may be formed using a variety of processes (e.g., the Vello process, Danner process, or other suitable process). Conversion processes for converting the glass tube 102 into various glass articles will now be described in more detail.

Figure 2:
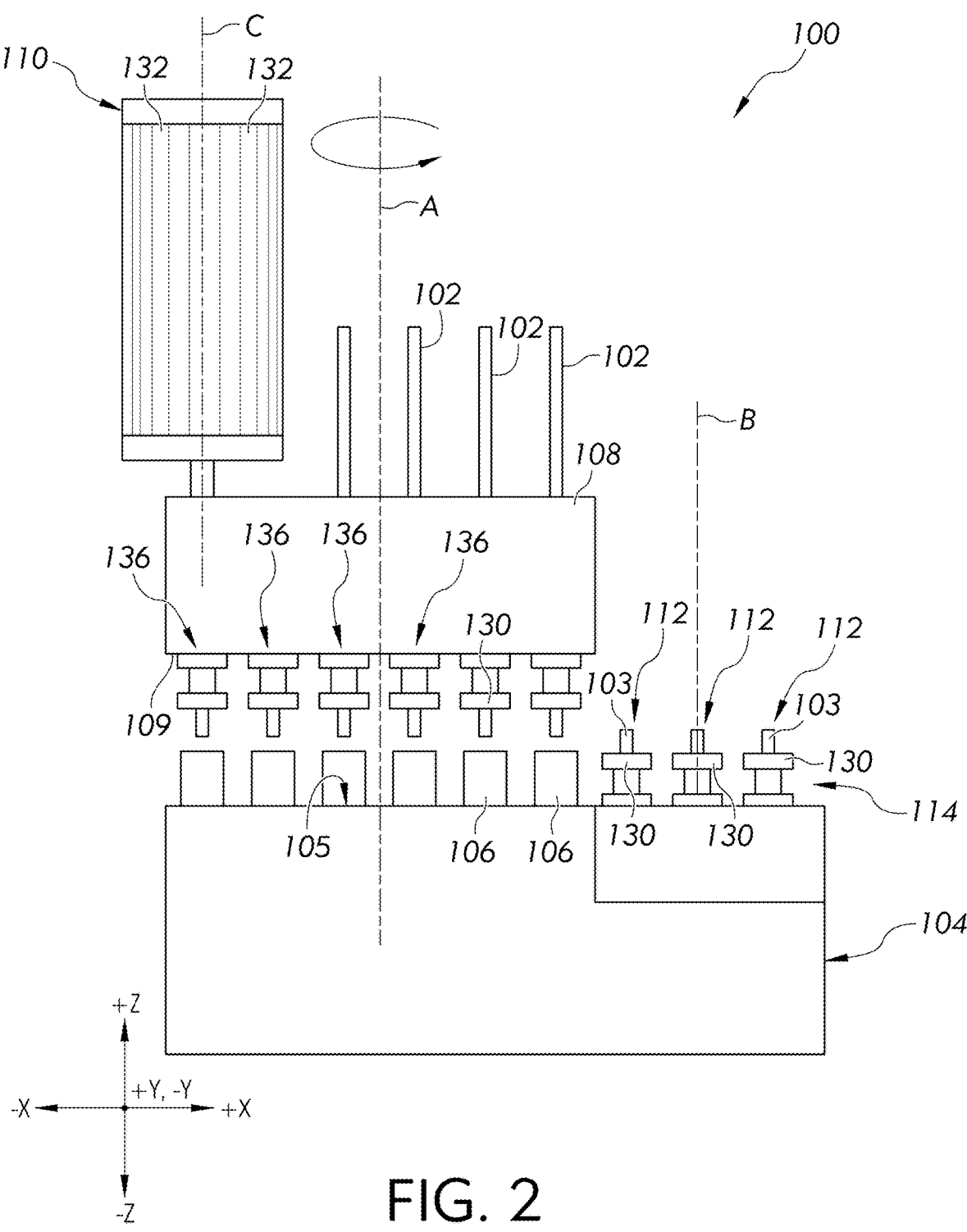
FIG. 2 schematically depicts an embodiment of a converter for producing glass articles from glass tubes, according to one or more embodiments shown and described herein.

FIG. 2 schematically depicts an example converter 100 for producing glass articles from a glass tube 102. The converter 100 may be used to convert glass tubes 102 into a plurality of glass articles, such as, but not limited to, vials, syringes, cartridges, ampoules, or other glass articles. The converter 100 comprises a base 104 having a plurality of processing stations 106 spaced apart in a circuit and a main turret 108 spaced apart from the base 104 and moveable relative to the base 104. At least one of the processing stations 106 comprises one or more of the thermally regulated forming tools described herein. The main turret 108 comprises a plurality of holders 130 extending from the main turret 108 towards the plurality of processing stations 106. The plurality of holders 130 are spaced apart from one another, and each of the plurality of holders 130 is aligned with one of the plurality of processing stations 106. The main turret 108 is operable to index each of the plurality of holders 130 into proximity with each of the plurality of processing stations 106 in succession.

In embodiments, the main turret 108 is rotatable relative to the base 104 about a central axis A. A glass tube loading turret 110 is positioned above the main turret 108 for feeding glass tube 102 to the main turret 108. The converter 100 may also include a plurality of secondary processing stations 112 on the base 104 and a secondary turret 114, which is rotatable relative to the base 104. As schematically depicted in FIG. 2, the base 104 of the converter 100 is stationary and the processing stations 106 may be coupled to an upper portion 105 of the base 104. The plurality of processing stations 106 are spaced apart from one another and arranged in a main circuit 116. In one or more embodiments, the main circuit 116 may be circular so that the main turret 108 may index a glass tube 102 through the plurality of processing stations 106 by rotation of the main turret 108 about the central axis A. The type and/or shape of the article to be made from the glass tube 102 may influence the number of processing stations 106 coupled to the base 104. The number of processing stations 106 of the base 104 may be from 14 processing stations 106 to 32 processing stations 106. Although the converter 100 and converting process are described herein in the context of a converter 100 having sixteen processing stations 106 in the main circuit 116, it is understood that the converter 100 may have more or less than sixteen processing stations 106 in the main circuit 116. The processing stations 106 may include, by way of example and without limitation, one or more heating, forming, polishing, cooling, separating, piercing, measuring, feeding, or discharge stations or other processing stations for producing the glass articles from the glass tubes 102. The type and/or shape of the article to be made from the glass tube 102 may also influence the type of processing stations 106 and/or order of processing stations 106 of the converter 100.

The main turret 108 may be positioned above the base 104 and may be rotatably coupled to the base 104 so that the main turret 108 is rotatable about the central axis A relative to the base 104. A drive motor (not shown) may be utilized to rotate the main turret 108 relative to the base 104. The main turret 108 includes a plurality of holders 130, which are configured to removably secure each glass tube 102 to the main turret 108. The holders 130 may be clamps, chucks, or other holding devices, or combinations of holding devices. The holders 130 may orient each glass tube 102 so that the glass tube 102 is generally parallel to the central axis A of the main turret 108 and generally perpendicular to the upper portion 105 of the base 104. Although the converter 100 is described in this specification in the context of a vertically oriented converter 100, it should be understood that the converter 100 may be oriented horizontally or at an angle. Each of the holders 130 extend from a bottom portion 109 of the main turret 108 in a direction towards the base 104 (i.e., in the −Z direction relative to the coordinate axis in FIG. 2), and each holder 130 is oriented to position the glass tube 102 in or proximate to each of the successive processing stations 106 of the main circuit 116 of the base 104 as the main turret 108 is indexed about the central axis A. Vertical orientation of the glass tubes 102 allows a downward protruding portion of each glass tube 102 to be cycled progressively through the processing stations 106 of the main circuit 116. Each holder 130 may be individually rotatable relative to the main turret 108 about holder axis D, which may be generally parallel to the central axis A of the main turret 108. Each of the holders 130 may be operatively coupled to a motor (not shown), continuous drive belt, or other drive mechanism for rotation of each of the holders 130 relative to the main turret 108. Rotation of the holders 130 allows for rotation of the glass tube 102 relative to stationary burners, forming tools, cooling nozzles, or other features of the processing stations 106.

Figure 3:
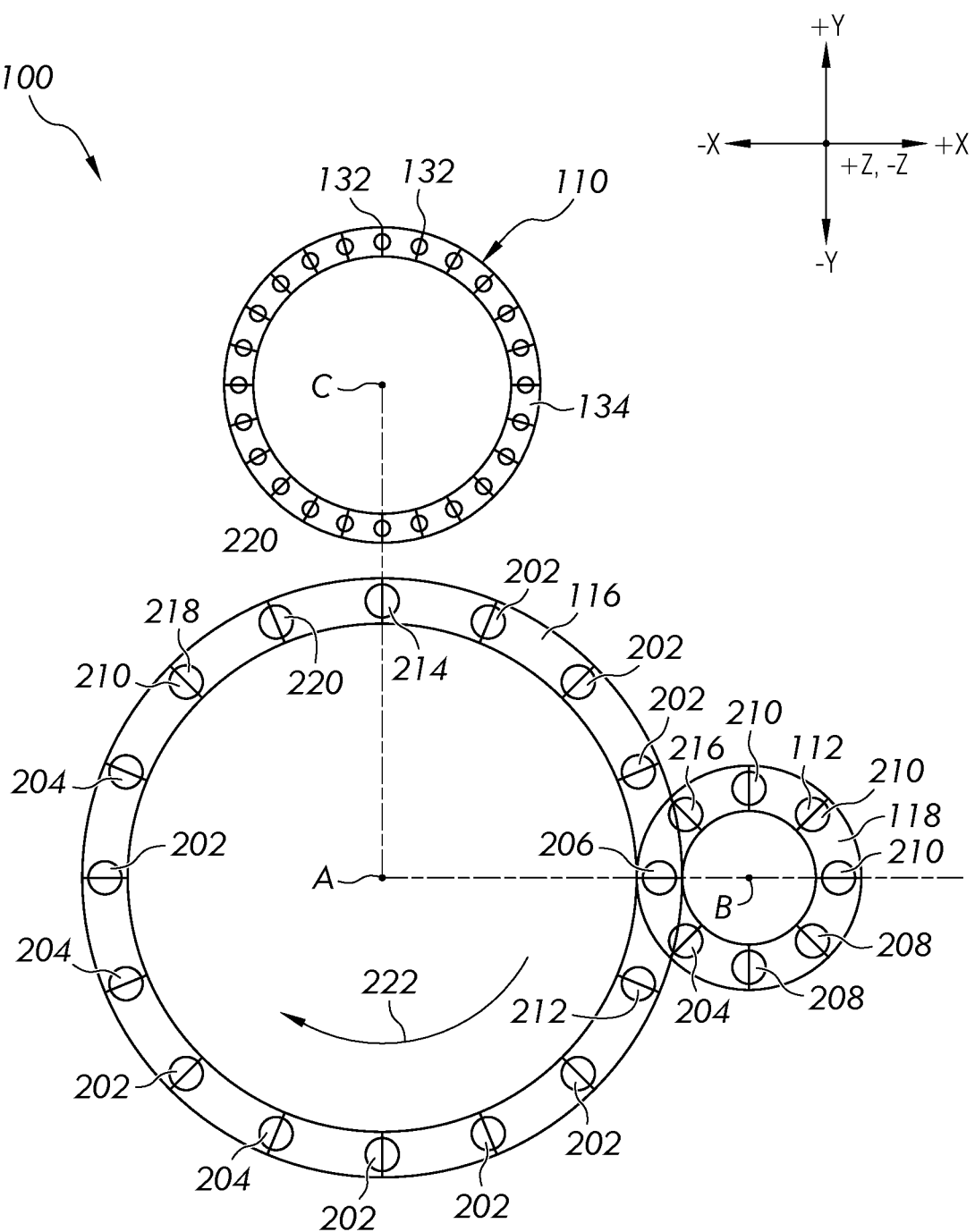
FIG. 3 schematically depicts a main turret, secondary turret, and feed turret of the glass tube converting machine of FIG. 2, according to one or more embodiments shown and described herein.

Referring to FIGS. 2 and 3, the converter 100 may have a plurality of secondary processing stations 112, which are also spaced apart and arranged in a secondary circuit 118 (FIG. 3), and a secondary turret 114 (FIG. 2) for indexing an article 103 (FIG. 2), which has been separated from the glass tube 102, through the plurality of secondary processing stations 112. The secondary turret 114 may be rotatable about a second axis B relative to the base 104. The second axis B may be generally parallel to central axis A of the main turret 108. The secondary turret 114 also includes a plurality of holders 130 to hold the glass articles 103 and position the glass articles 103 to engage with each of the secondary processing stations 112 in succession. The secondary turret 114 may receive the articles 103 from a separating station 206 (FIG. 3) of the main turret 108, index the articles 103 through the plurality of secondary processing stations 112 through rotation of the secondary turret 114, and discharge the finished articles from the converter 100.

The glass tube loading turret 110 is positioned above the main turret 108. In embodiments, the glass tube loading turret 110 may be offset from the central axis A of the main turret 108. The glass tube loading turret 110 may be rotatable about an axis C, which may be generally parallel to the central axis A of the main turret 108. The glass tube loading turret 110 may be independently supported in a stationary position relative to the main turret 108, and rotation of the glass tube loading turret 110 may be independent of the rotation of the main turret 108. Referring to FIGS. 2 and 3, in some embodiments, the glass tube loading turret 110 may include a plurality of loading channels 132 arranged in a circular circuit 134 and configured to hold glass tubes 102. The glass tube loading turret 110 may be positioned to orient one of the loading channels 132 into vertical alignment (i.e., aligned in a direction parallel to the central axis A of the main turret 108 and/or parallel to the Z axis of FIG. 2) with a processing station 106 of the main circuit 116 of the converter 100 and the corresponding holders 130 on the main turret 108 that are indexed through the processing station 106 of the main circuit 116. In one or more embodiments, the processing station 106 aligned with the glass tube loading turret 110 may be a tube loading station 214 (FIG. 3). When the converter 100 has converted all or a portion of the glass tube 102 at a specific holder position 136 into one or more articles, the glass tube loading turret 110 may deliver a new length of glass tube 102 through the top of the main turret 108 to the holder 130 at the holder position 136, when the holder position 136 indexes into alignment with the tube loading station 214 of the main circuit 116. In alternative embodiments, the converter 100 may include an arm (not shown) electromechanically movable between the main turret 108 and the glass tube loading turret 110. When the converter 100 has converted all or a portion of the glass tube 102 at a specific holder position 136, the arm may grab a new length of glass tube 102 from the glass tube loading turret 110 or other glass tube staging device and deliver the new length of glass tube 102 to the main turret 108 at the specific holder position 136. Other methods of delivery of new lengths of glass tube 102 to the main turret 108 are contemplated.

Referring to FIG. 3, as previously described, the plurality of processing stations 106 of the converter 100 may include one or more heating stations 202, forming stations 204, separating stations 206, polishing stations 208, cooling stations 210, piercing stations 212, tube loading stations 214, discharge stations 216, measuring stations 218, tube length drop stations 220, or other stations and/or combinations of these stations. FIG. 3 schematically depicts the arrangement of the processing stations 106 for a converter 100 having a main circuit 116 of sixteen processing stations 106 and a secondary circuit 118 of eight secondary processing stations 112. As described, the processing stations 106 of the main circuit 116 are evenly spaced apart and evenly distributed about a circular circuit and the secondary processing stations 112 of the secondary circuit 118 are also evenly spaced apart and evenly distributed about a circular circuit. FIG. 3 also schematically depicts the glass tube loading turret 110 having a plurality of loading channels 132. In FIG. 3, the glass tube loading turret 110 is shown in a position spaced apart from the main circuit 116 for purposes of illustration. Although the glass tube loading turret 110 is depicted as having twenty-four loading channels 132, it is understood that the glass tube loading turret may have more or less than twenty-four loading channels 132.

With respect to the direction of indexing 222 of the main turret 108, the heating stations 202 may be positioned before the separating stations 206 and each of the forming stations 204 to preheat target regions of the glass tube 102 to a target temperature at which the target region of the glass tube 102 becomes plastically deformable and may effectively be shaped or cut without cracking or shattering the glass. At the separating station 206, the formed glass article 103 (FIG. 2) may be separated from the glass tube 102 (FIG. 2). The separating station 206 may also be the processing station 106 at which the partially formed glass article 103, once separated, is transferred to the secondary turret 114 (FIG. 2) to be indexed through the secondary circuit 118 of secondary processing stations 112. The piercing station 212 may be positioned on the main circuit 116 downstream of the separating station 206 in the direction of indexing 222 of the main turret 108. At the piercing station 212, an end of the glass tube 102 previously closed by the separating station 206 is pierced, thereby forming an opening in the glass tube 102.

The forming stations 204 of the main turret 108 may be positioned downstream of the piercing station 212 in the direction of indexing 222. At the forming stations 204, the glass tube 102 is iteratively shaped into the desired shape of the finished glass article. As noted above, one or more heating stations 202 may be positioned before each of the forming stations 204 to preheat target regions of the glass tube 102 to a temperature at which the glass tube may be formed. The forming stations 204 of the main turret 108 shape one end of the glass articles 103, and the forming stations 204 of the secondary turret 114 shape the other end of the glass articles 103. In one or more embodiments, the converter 100 may be used to produce vials from the glass tubes 102, and the forming stations 204 of the converter 100 may include one or more shoulder forming stations, one or more flange forming stations, and one or more flange finishing stations, with one or more heating stations 202 positioned before and between each of the forming stations 204. The main circuit 116 may further include a measuring station 218, at which a dimensioning system may be used to measure one or more dimensions of the glass tube 102, such as the diameter and thickness for example, and one or more dimensions of the features formed by the forming stations 204. Feature dimensions may include flange thickness, flange length, neck length, neck thickness, overall article length, other feature dimension, or combinations thereof. The measuring station 218 may be positioned directly after the last forming station 204 so that the dimensions are measured while the glass tube 102 is still at elevated temperature. Alternatively, the measuring station 218 may be positioned after one or more cooling stations 210 to measure the dimensions of the glass tube 102 and/or glass article at a lower temperature.

Still referring to FIG. 3, one or more cooling stations 210 may be positioned after the forming stations 204 in the direction of indexing 222 of the main turret 108. A tube length drop station 220 may be positioned after the forming stations 204, between the forming stations 204 and the separating station 206, to drop the partially formed glass tube 102 down, thereby positioning the glass tube 102 for cutting to a target length at the separating station 206. The main circuit 116 may also include a tube loading station 214 for loading a new length of glass tube 102 feedstock from the glass tube loading turret 110 to the main turret 108 (FIG. 2). In one or more embodiments, the tube loading station 214 may be incorporated into a cooling station 210. The tube loading station 214 may be positioned between the last forming station 204 and the separating station 206.

The forming stations 204 of the main turret 108 form features at a first end of the glass article 103. For example, the forming stations 204 may form a shoulder and flange at the top (first end) of a glass article 103 that is a vial or cartridge. Once the glass article 103 is separated from the glass tube 102 at the separating station 206, the glass article 103 is transferred to the secondary processing stations 112 of the secondary turret 114. The secondary processing stations 112 may include one or more forming stations 204 for forming a second end of the glass article 103, which is opposite the first end of the glass article 103. For example, the forming stations 204 of the secondary processing stations 112 may form one or more features at a bottom (second end) of the glass article 103 that is a vial.

The secondary processing stations of the secondary circuit may include one or more heating stations 202, forming stations 204, polishing stations 208, cooling stations 210, discharge stations 216, or other stations or combinations of secondary processing stations 112. In one or more embodiments, the secondary processing stations 112 of the secondary circuit 118 may be used to form one or more features of the glass article 103, such as a vial, ampoule, cartridge, or syringe, for example, at an end of the glass article 103 opposite the end formed by the main turret 108. For example, in some embodiments, the glass article 103 is a vial and the forming stations 204 of the secondary circuit 118 may form the bottom of the vial. Other features are also contemplated such as those features characteristic of ampoules, cartridges, syringes, and the like. The secondary circuit 118 may include one or more polishing stations 208 to finish the surface of the glass article. The secondary circuit 118 may further include a plurality of cooling stations 210 and the discharge station 216, at which station the finished glass article may be discharged from the converter 100.

The previous description of the processing stations 106 of the main circuit 116 and the secondary processing stations 112 of the secondary circuit 118 may represent a typical converter 100 for producing vials from the glass tube 102. However, it is understood that more or fewer processing stations 106 and secondary processing stations 112 may be utilized to make vials having different shapes or other glass articles, such as cartridges, syringes, ampoules, or other glass articles. Additionally, it is understood that the processing stations 106 and secondary processing stations 112 may be arranged in any of a number of different orders and/or configurations in order to produce differently shaped glass articles.

Figure 4A:
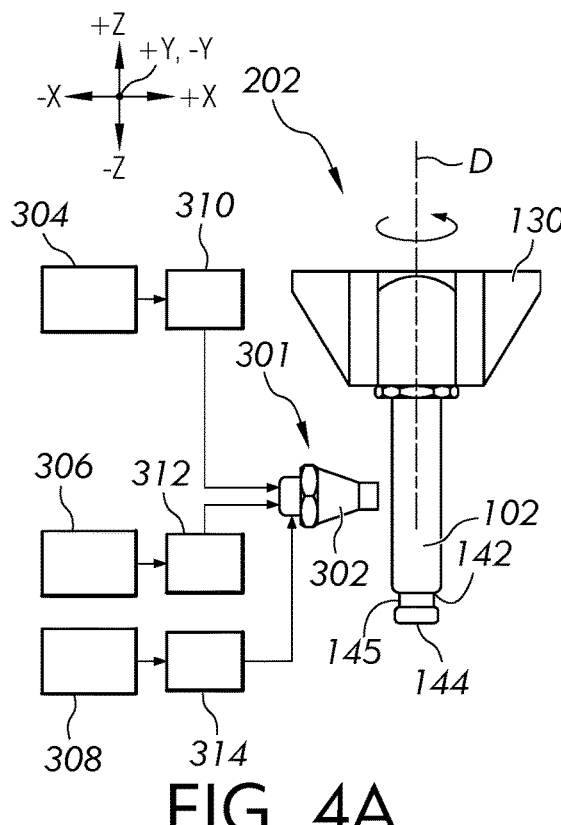
FIG. 4A schematically depicts a heating station of the converter of FIG. 2, according to one or more embodiments shown and described herein.

Referring now to FIG. 4A, a heating station 202 of the converter 100 is schematically depicted. In FIG. 4A, the glass tube 102 has been reformed to include a plurality of features, such as a shoulder 142, flange 144, and neck 145 for example, for producing a vial. In embodiments, the shoulder 142, flange 144, and neck 145 may be formed in one or more of the forming stations 204 and 204' described herein. For example, as described herein, in embodiments, the shoulder 142 may initially be formed by the forming station 204 described with respect to FIG. 4C, while the neck 145 and flange 144 may be formed via the forming station 204' described herein with respect to FIG. 4D. Although the glass article 103 is shown as being a vial in FIG. 4A, it is understood that the glass article 103 could have features characteristic of an ampoule, syringe, cartridge, bottle, or other article.

As depicted in FIG. 4A, each of the heating stations 202 may include one or more heating elements 301. Examples of heating elements 301 may include, but are not limited to fuel burners, lasers such as $CO_2$ lasers for example, induction heaters, other heating devices, or combinations of these. In some embodiments, a laser in combination with one or more forming tools 324 (FIG. 4C) may be used to heat the glass tube 102 and/or control a surface temperature of the glass tube 102. As illustrated in FIG. 4A, in embodiments, the heating element 301 may include one or more burners 302, which are used to heat targeted regions of the glass tube 102 prior to a forming operation performed at the forming station 204 (FIG. 3) or separating operation performed at the separating station 206 (FIG. 3). Although FIG. 4A depicts a single burner 302, it is understood that more than one burner 302 may be employed in a single heating station 202. Each burner 302 may be fluidly coupled to a fuel supply 304, an oxygen supply 306, and, optionally, an air supply 308. Examples of fuels for the burner may include, but are not limited to hydrogen, hydrocarbon fuel gases such as methane, propane, and butane for example, other fuels, or combinations of these. Each burner 302 may include a fuel control valve 310 to control the mass flow rate of fuel gas to the burner 302. Each burner 302 may also include an oxygen control valve 312 to control the mass flow rate of oxygen to the burner 302. Each burner 302 may further include an air control valve 314 for optionally controlling a mass flow rate of air to the burner 302. The burner 302 combusts the fuel gas in the presence of oxygen and/or air to produce a flame that heats at least the target region of the glass tube 102.

The heat of the flame generated by the burner 302 may be increased or decreased by changing the mass flow rates of fuel gas, oxygen, and air to the burner 302 and by changing the ratio of fuel gas to oxygen and/or the ratio of fuel gas to air fed to the burner 302. One or more of the fuel control valve 310, oxygen control valve 312, or air control valve 314 may be adjusted to adjust the ratio of fuel to oxygen and/or air. The burners 302 are continuously burning and the glass tubes 102 are indexed into and out of contact with the flame produced by the burners 302 by rotation of the main turret 108 and/or the secondary turret 114 to index the glass tube 102 into and out of the heating station 202. While positioned at the heating station 202, each glass tube 102 may be rotated by the holder 130 about the holder axis D relative to the burner 302 so that the glass tube 102 may be evenly heated around the circumference of the glass tube 102 in the specific regions to be formed in downstream forming stations 204 (FIG. 3).

Figure 4B:
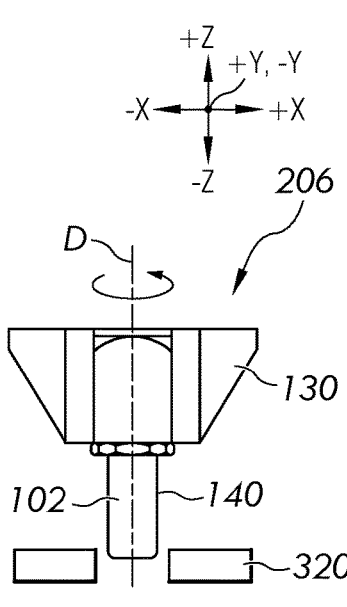
FIG. 4B schematically depicts a separating station of the converter of FIG. 2, according to one or more embodiments shown and described herein.

Referring now to FIG. 4B, a separation station 206 of the converter 100 is schematically depicted. The separating station 206 is positioned after one or more heating stations 202 in the direction of indexing 222 of the main turret 108. The heating stations 202 positioned before the separating station 206 heat the glass tube 102 to make the glass plastically deformable. The separating station 206 may include a separating tool 320. While the glass tube 102, which has been made plastically deformable by the previous heating stations 202, is rotated by the holder 130 about the holder axis D, the separating tool 320 may be engaged with the outer surface 140 of the glass tube 102 to cut the glass tube 102 to a target length, thereby separating an article 103 (FIG. 2) from the glass tube 102. Alternatively, in some embodiments, the separating station 206 may include a burner, such as a hydrogen/oxygen burner for example, and/or a laser, such as a $CO_2$ laser for example, for cutting the glass tube 102 to the target length and separating the article 103 from the glass tube 102. In other embodiments, the separating station 206 may include separating tools 320 and at least one of a hydrogen/oxygen burner or a laser. Once separated from the glass tube 102, the article 103 may be transferred to the secondary turret 114 (FIG. 2) or discharged from the converter 100.

Figure 4C:
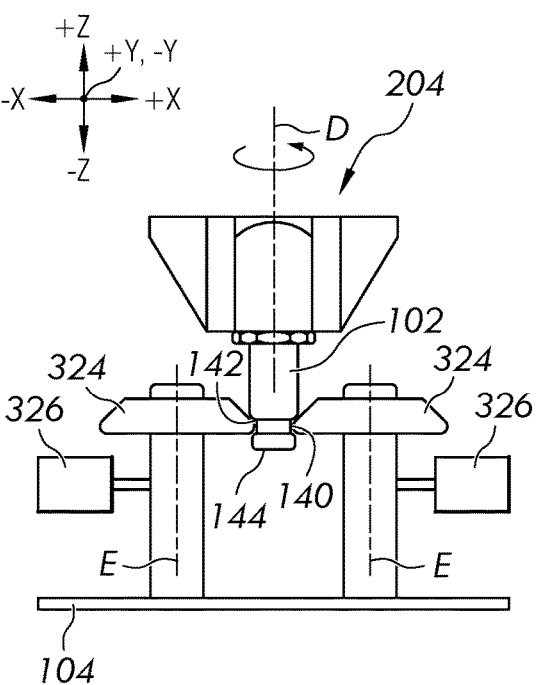
FIG. 4C schematically depicts a forming station of the converter of FIG. 2, according to one or more embodiments shown and described herein.
Figure 4D:
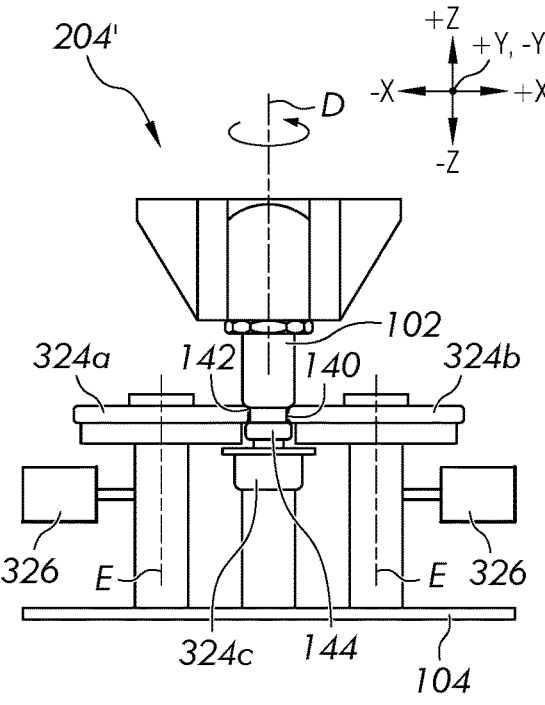
FIG. 4D schematically depicts another embodiment of a forming station of the converter of FIG. 2, according to one or more embodiments shown and described herein.

Referring now to FIGS. 4C and 4D, examples of forming stations 204 of the converter 100 are schematically depicted. FIG. 4C schematically illustrates an embodiment of a forming station 204 for forming the shoulder 142 of a glass vial formed from the glass tube 102. FIG. 4D schematically depicts an exemplary embodiment of a forming station 204' for forming the neck 145 (see FIG. 4A) and flange 144 of a glass vial formed from the glass tube 102. While the forming stations 204 and 204' for forming the shoulder 142 and flange 144 are described herein as being separate forming stations, it should be understood that the shapes of the forming tools described herein may be adapted to form such components in combination.

While the forming stations 204 and 204' are described in detail herein, it should be understood that the converter 100 may include more than two forming stations. For example, in embodiments, the converter 100 may include an additional forming station (not depicted) in the main circuit 116 after the forming station 204' described herein with respect to FIG. 4D. The additional forming station may comprise a similar set of forming tools as those described herein with respect to the forming station 204', but include a forming tool sized to fit into the opening 150 of the glass tube 102 that is sized to more closely approximate the size of the opening 150 than the third forming tool 324c of the forming station 204' described herein with respect to FIG. 4D. After the glass tube 102 is reworked via the forming station 204' described herein, the forming tool of the additional forming station may be inserted into the opening 150 and the forming tool may have a tighter tolerance to the opening 150 than the third forming tool 324c to facilitate forming an opening in the flange 144 and neck 145 having a desired geometry.

Referring to FIG. 4C, the forming station 204 comprises one or more forming tools 324 rotationally coupled to the forming station 204. The forming tools 324 may be rotatable relative to the base 104 (FIG. 2) about tooling axes E, which are generally parallel to the central axis A (FIG. 2) of the main turret 108 (FIG. 2). When indexed into the forming station 204, the glass tube 102, which has been heated in a prior heating station 202, is rotated by the holder 130. The rotatable forming tools 324 are engaged with the outer surface 140 of the glass tube 102. The forming tools 324 may be actuated into engagement with the outer surface 140 of the glass tube 102 by one or more actuators 326. The forming tools 324 are maintained in contact with the glass tube 102 at a tool pressure maintained by the actuators 326 for a contact time. Contact of the forming tools 324 with the outer surface 140 of the heated glass tube 102 forms the glass tube 102 into the desired shape. Upon expiration of the contact time, the actuators 326 withdraw the forming tools 324 from engagement with the glass tube 102. In one or more embodiments, the contact time may be different than a dwell time of the converter 100.

Referring now to FIG. 4D, the forming station 204' for forming the flange 144 comprises three forming tools 324a, 324b, and 324c. Two of the forming tools 324a and 324b contact the outer surface 140 of the glass tube 102 to form the outer contour of the flange 144. The third forming tool 324c contacts interior surface 146 of the glass tube 102 radially inward of the flange 144 to form the inner diameter of the glass tube 102 at the flange 144. At least a portion of the third forming tool 346c is inserted into the opening 150 of the glass tube 102 (see FIG. 1) in order to form the inner diameter of the glass tube 102 at the flange 144. The third forming tool 324c also contacts the axial end of the glass tube 102 to form the axial surface of the flange 144. In embodiments, the third forming tool 324c may be stationary and the glass tube 102 rotated about the third forming tool 324c by the holder 130. Although described relative to forming the structures of a vial, the forming stations 204 may be configured to form other structures, such as the shoulder, neck, or tapered tip of an ampoule for example, or any other structure associated with articles other than glass vials.

Various different embodiments of the third forming tool 324c (and corresponding alterations to the forming station 204') are described herein to facilitate reworking the glass tube 102 to form the flange 144 with minimal defects. As described herein, one or more of the heating stations 202 of the converter 100 may be disposed between different forming stations so as to re-heat the glass tube 102 to facilitate the forming tools re-shaping the glass tube 102. As such, the temperature of the glass tube 102 may be higher than the third forming tool 324c when the third forming tool 324c is initially inserted into the opening 150 of the glass tube 102. In embodiments, a thin layer of lubricant, such as oil, may be disposed between the glass tube 102 and the third forming tool 324c to reduce friction and facilitate relative movement between the glass tube 102 and the third forming tool 324c.

In the event that an insufficient quantity of lubricant is applied to the third forming tool 324c, excessive friction may result in defects (e.g., friction marks and the like) at the interior surface 146 of the glass tube 102. Moreover, if the temperature of the third forming tool 324c exceeds a predetermined threshold (e.g., 200° C.), the lubricant may burn, which may result in the formation of a carbon layer on the third forming tool 324c. Such a carbon layer may alter the external shape of the third forming tool 324c, leading to aspects of the resultant glass article being out of specification.

In view of this, embodiments of the third forming tool 324c comprise a fluid cavity in fluid communication with a fluid source (not depicted in FIG. 4D). Fluid from the fluid source may serve a variety of functions depending on the implementation. For example, as described herein with respect to FIGS. 5A, 5B, 6A, and 6B, the third forming tool 324c may comprise one or more openings for delivery of the fluid to the interface between the third forming tool 324c and the glass tube 102. In such embodiments, the fluid may be a lubricant (e.g., oil, an air-oil mixture, or the like), and the fluid source may comprise a lubricant source configured to provide a predetermined volume of fluid (e.g., a lubricant) to the third forming tool 324c prior to or during the third forming tool 324c being in contact with the glass tube 102. Such an arrangement ensures an adequate supply of lubricant, preventing friction marks. Additionally, as described herein with respect to FIGS. 7A, 7B, 8, 9A, and 9B, the third forming tool 324c may comprise a thermally conductive insert extending therethrough. The thermally conductive insert may be constructed of a thermally conductive material to remove heat received from the glass tube 102 from the interface between the third forming tool 324c and the glass tube 102. In such embodiments, the fluid may function as a coolant, and the coolant may be circulated around at least a portion of the thermally conductive insert such that the coolant serves as a heat sink for the heat received from the glass tube 102. The thermally conductive insert serves to regulate the temperature of the portion of the third forming tool 324c contacting the glass tube 102 to avoid lubricant burn-off and alterations in shape of the third forming tool 324c.

A cooling station 210 having one or more cooling nozzles can be positioned to direct a cooling fluid, such as chilled air or an inert gas for example, towards the glass tube 102. One or more of the cooling nozzles may be positioned to direct the cooling fluid to specific regions of the glass tube 102. One or more cooling fluid control valves may be fluidly coupled to the cooling nozzles to control the mass flow rate of cooling fluid to the cooling nozzles, which enable control of the rate of cooling of the glass tube 102 as well as the temperature of the glass tube 102 and temperature gradients in the glass tube 102.

FIGS. 4A-4D include schematic illustrations of several different examples of processing stations 106 that may be utilized in the converter 100. However, it should be understood that other processing stations 106 having different structures, combinations of structures, or functions, may be utilized to achieve the desired conversion of the glass tube 102 into one or more glass articles.

Referring again to FIG. 3, in operation, the main turret 108 indexes the glass tubes 102, which are secured in the holders 130, into a processing station 106. A specific operation, such as heating, forming, piercing, separating, cooling, dropping, feeding, etc., is performed on the glass tubes 102 at each of the processing stations 106. A dwell time is the time that the glass tube 102 spends in a particular processing station 106 before being indexed by the main turret 108 to the next subsequent processing station 106. The converter 100 may be tuned so that all of the processing stations 106 complete their operations within the dwell time. At the end of the dwell time, the main turret 108 indexes the glass tubes 102 to the next processing stations 106. The index time refers to the time that it takes for the main turret 108 to index the glass tubes 102 from one processing station 106 to the next processing station 106 and is measured in units of time. The total time per part per station, as used in this disclosure, is the sum of the dwell time and the index time.

Figures 5A, 5B:
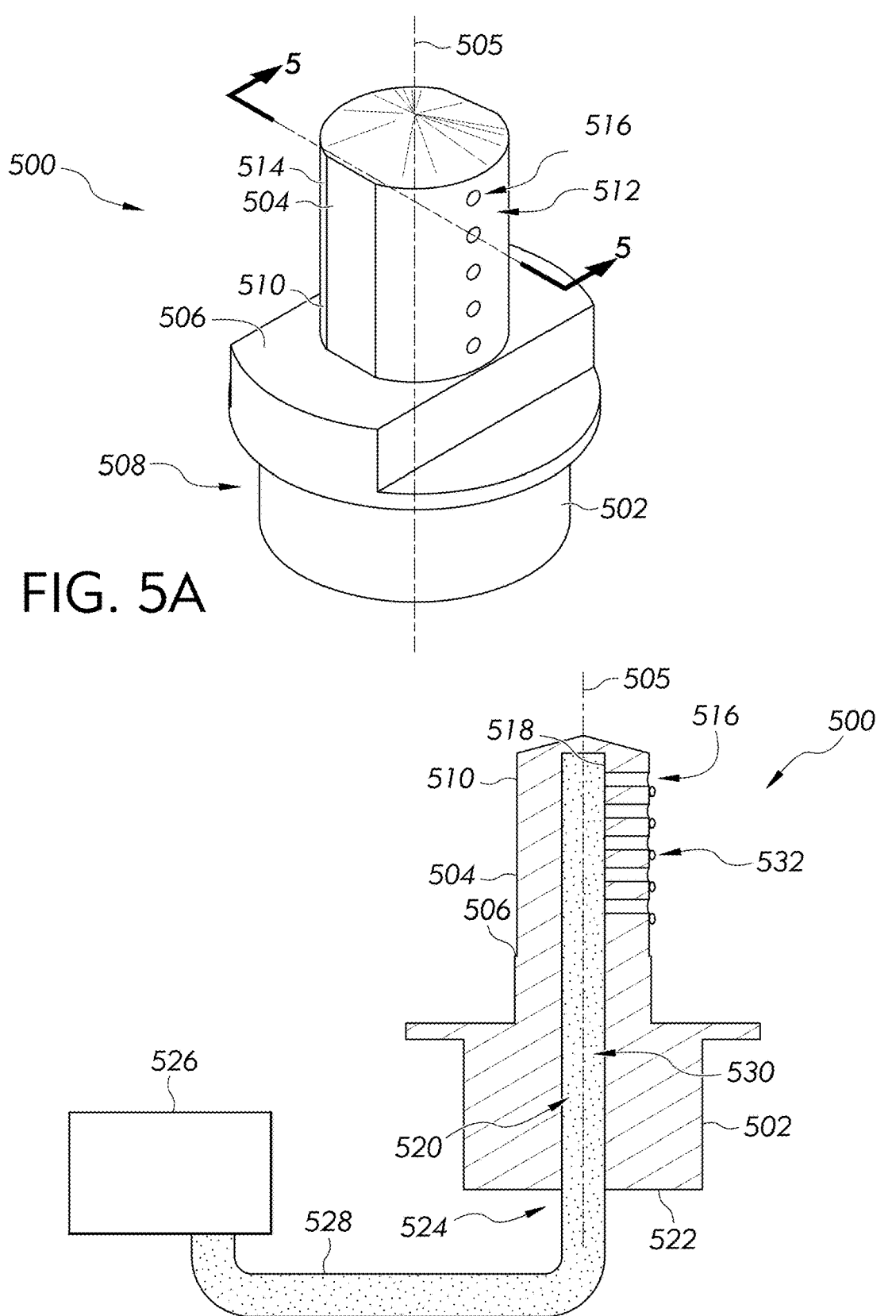
FIG. 5A schematically depicts a forming tool for use in a forming station in a process of converting a glass tube into a glass article, the forming tool comprising at least one fluid opening for providing a lubricant between the forming tool and the glass tube, according to one or more embodiments described herein.
FIG. 5B schematically depicts a cross-sectional view of the forming tool depicted in FIG. 5A through the line 5-5 of FIG. 5A, with a fluid cavity thereof being in fluid communication with a lubricant source, according to one or more embodiments described herein.

Referring now to FIGS. 5A and 5B, a forming tool 500 for use in a forming station for converting a glass tube into a glass article is schematically depicted. FIG. 5A depicts a perspective view of the forming tool 500. FIG. 5B schematically depicts a cross-sectional view of the forming tool through the line 5-5 depicted in FIG. 5A. In embodiments, the forming tool 500 may be used in place of the third forming tool 324c of the converter 100 described herein with respect to FIGS. 2-4D. In embodiments, for example, the forming tool 500 is inserted into the opening 150 in the glass tube 102 in the process of forming the flange 144 and/or the shoulder 142 of a vial. In embodiments, the forming tool 500 is inserted into the opening 150 in the glass tube 102 to form portions of other forms of glass containers (e.g., syringes, ampoules, cartridges and other glass articles).

As depicted in FIG. 5A, the forming tool 500 comprises a base portion 502 and an insertion portion 504 extending from a surface 506 of the base portion 502. In embodiments, the base portion 502 and the insertion portion 504 form a monolithic body 508. In embodiments, the monolithic body 508 is machined from a metallic material or alloy (e.g., steel, stainless steel, brass). In embodiments, the monolithic body 508 is machined from a single piece of metallic material. In embodiments, at least a portion of the forming tool 500 is constructed of a crystalline material (e.g., graphite) or composite material. In embodiments, rather than forming the monolithic body 508, the forming tool 500 may be constructed of two or more different materials. In embodiments, for example, the insertion portion 504 (or a portion thereof) and the base portion 502 are constructed of different materials.

In embodiments, the base portion 502 is fixedly attached to the base 104 of the converter 100 (see FIG. 2) via a support structure. As depicted, the base portion 502 comprises a larger cross-sectional size than the insertion portion 504. In embodiments the surface 506 of the base portion 502 is structured to contact an end of the glass tube 102 (e.g., to form an outer surface of the flange 144). The insertion portion 504 comprises an external surface 510 that is shaped to be inserted into the opening 150 of the glass tube 102. In embodiments, the external surface 510 comprises a curved contact surface 512 and one or more planar portions 514. In embodiments, the curved contact surface 512 extends along a predetermined curved contour (e.g., a circular contour) that is shaped based on a desired internal shape of the glass container being formed. In embodiments, the one or more planar portions 514 may comprise cutaways from the curved contour such that only a portion of the external surface 510 contacts the interior surface 146 of the glass tube when the insertion portion 504 is inserted in the opening 150 (see FIG. 1). The one or more planar portions 514 may effectively reduce a contact area between the insertion portion 504 and the glass tube 102, thereby reducing friction and heating of the forming tool 500. It should be understood that the insertion portion 504 may have a variety of different shapes and embodiments are envisioned where the one or more planar portions 514 are excluded.

The insertion portion 504 comprises one or more fluid openings 516 extending between an interior surface 518 thereof (see FIG. 5B) and the external surface 510. As described herein, the one or more fluid openings 516 facilitate provision of a lubricant between the forming tool 500 and the glass tube 102 to facilitate relative movement thereof (e.g., via rotation of the glass tube 102, via rotation of the forming tool 500) by reducing friction. In embodiments, the one or more fluid openings 516 comprises a plurality of fluid openings. For example, in the embodiment depicted in FIG. 5A, the one or more fluid openings 516 comprises an array of fluid openings arranged in a column extending parallel to a central axis 505 of the forming tool 500. The array of fluid openings extends in an axial direction to facilitate application of lubricant to the entire axial extent of contact between the insertion portion 504 and the glass tube 102 when the insertion portion 504 is inserted into the opening 150.

The one or more fluid openings 516 in the insertion portion 504 may take a variety of forms depending on the implementation. For example, in embodiments, the one or more fluid openings 516 comprise discrete openings. In embodiments, such discrete openings may be formed by shaping the monolithic body 508 (e.g., via machining). In embodiments, at least a portion of the forming tool 500 is formed via an additive manufacturing process (e.g., selective laser melting, direct material deposition, binder jetting, or other suitable process) and the one or more fluid openings 516 are constructed as part of an initial geometry of the monolithic body 508 (e.g., the one or more fluid openings 516 may be formed without post processing techniques). In embodiments, the one or more fluid openings 516 do not comprise discrete openings, but rather flow paths through the insertion portion 504 resulting from an inherent porosity of the material out of which the insertion portion 504 is formed. For example, in embodiments, the monolithic body 508 (or a portion of the forming tool 500 within the insertion portion 504) is constructed from a porous material such as a carbon-based material (e.g., graphite or a composite), stainless steel, brass, nickel or cobalt-containing alloys, or a ceramic. Such flow paths resulting from the porosity of the insertion portion 504 may not extend in straight lines.

Referring still referring to FIG. 5A, in embodiments where the one or more fluid openings 516 comprise discrete openings in the insertion portion 504, the one or more fluid openings 516 may be disposed in a variety of different arrangements depending on the implementation. For example, in embodiments, the one or more fluid openings 516 are disposed on the curved contact surface 512 that contacts the glass tube 102 during the conversion process. Such an arrangement beneficially facilitates lubricant being spread between the external surface 510 and the interior surface 146 of the glass tube 102 (see FIG. 1) during rotation of the glass tube 102 relative to the forming tool 500 (e.g., via rotation of the holder 130 of the converter 100, see FIG. 2). That is, arranging the one or more fluid openings 516 on a surface that contacts the glass tube 102 facilitates formation of a layer of lubricant at an interface between the glass tube 102 and the insertion portion 504. In a process of reshaping the glass tube 102, the glass tube 102 may rotate relative to the forming tool 500 in a number of revolutions (e.g., 2 or more revolutions, 2 revolutions, 3 revolutions, 4 revolutions, etc.) while in a particular forming station. The lubricant layer formed as a result of the one or more fluid openings 516 reduces friction and avoids defects (e.g., friction marks, thermal checks, etc.) in the resultant glass container.

FIG. 5B schematically depicts a cross-sectional view of the forming tool 500 through the line 5-5 of FIG. 5A. The forming tool 500 comprises a fluid cavity 520 extending through the base portion 502. In embodiments, the fluid cavity 520 extends through the insertion portion 504 such that the fluid cavity 520 is in fluid communication with the one or more fluid openings 516. In the depicted embodiment, the fluid cavity 520 extends along the central axis 505 of the forming tool 500 through the entire axial extent thereof. It should be understood that the fluid cavity 520 may have a variety of different forms depending on the implementation. In the depicted embodiment, the fluid cavity 520 extends to a distal end 522 of the forming tool 500 to form a fluid inlet 524. The fluid inlet 524 permits entry of a fluid from an external source for provision to the interface with the glass tube 102 via the one or more fluid openings 516. Various alternative locations for the fluid inlet 524 are contemplated and within the scope of the present disclosure (e.g., on the surface 506, on a side surface of the base portion 502).

The one or more fluid openings 516 extend between an interior surface 518 defining the fluid cavity 520 and the external surface 510 of the insertion portion 504. As such, the one or more fluid openings 516 are in fluid communication with the fluid cavity 520. As depicted in FIG. 5B, the fluid cavity 520 is in fluid communication with a lubricant source 526 via a fluid conduit 528. In embodiments, the lubricant source 526 is a component of the converter 100 (e.g., disposed on the base 104 in the forming station 204', see FIG. 4D). In embodiments, the lubricant source 526 comprises a lubricant delivery mechanism (e.g., a valve) coupled to a lubricant source (e.g., a reservoir filled with a lubricant). The lubricant source 526 may be activated to provide a predetermined volume of a lubricant 530 into the fluid cavity 520. The lubricant 530 may be pressurized such that the lubricant 530 flows through the fluid cavity 520 and through the one or more fluid openings 516, resulting in one or more droplets 532 forming on the external surface 510 of the insertion portion 504. Relative movement between the glass tube 102 and the insertion portion 504 may result in circumferential spread of the droplets 532, forming a film of lubricant at the interface between the insertion portion 504 and the interior surface 146 of the glass tube 102 (see FIG. 1).

The predetermined volume of the lubricant 530 emitted by the lubricant source 526 may be predetermined as a quantity needed to avoided excessive friction and be dependent on the extent of the contact area between the insertion portion 504 and the glass tube 102. For example, in embodiments, the lubricant source 526 may include a valve that is opened for a predetermined period to provide the volume of the lubricant 530 into the fluid cavity 520. In embodiments, the lubricant source 526 comprises pressurized fluid that is emitted at a pressure upon opening of the valve. The pressure may be determined based on the number of fluid openings in the insertion portion 504 to ensure a sufficient volume of the lubricant 530 is supplied to the fluid cavity 520 in order to create droplets 532 at each of the fluid openings. In embodiments, the pressure with which the lubricant 530 is provided to the fluid cavity 520 via the lubricant source 526 is determined based at least in part on the size of the one or more fluid openings 516. If the one or more fluid openings 516 are smaller in size, the pressure may be greater to facilitate droplet formation. In embodiments, the lubricant source 526 is designed to provide the predetermined volume of the lubricant 530 within a predetermined time interval (e.g., while different glass tubes 102 are being transferred to and from the forming station 204′).

In embodiments, the fluid conduit 528 comprises a pipe extending through a support structure of the converter 100 (e.g., a support arm of the forming tool 500 extending from the base 104). In embodiments, the fluid conduit 528 comprises a flexible tube extending externally to the forming tool 500. It should be understood that the lubricant source 526 may vary depending on the type of lubricant that is used. For example, in embodiments, the lubricant 530 comprises a liquid lubricant such as an oil. In embodiments, the lubricant 530 comprises an air-oil mixture. In such embodiments, the fluid conduit 528 may extend at least partially through the forming tool 500. In embodiments, for example, the fluid conduit 528 may extend through the forming tool 500 and comprise a plurality of openings aligned with each of the one or more fluid openings 516 to emit pressured lubricant streams therethrough to generate droplets 532. In embodiments, the surface 506 of the base portion 502 comprises at least one lubricant drain (e.g., groove) for directing used lubricant off the surface 506.

Figure 6A:
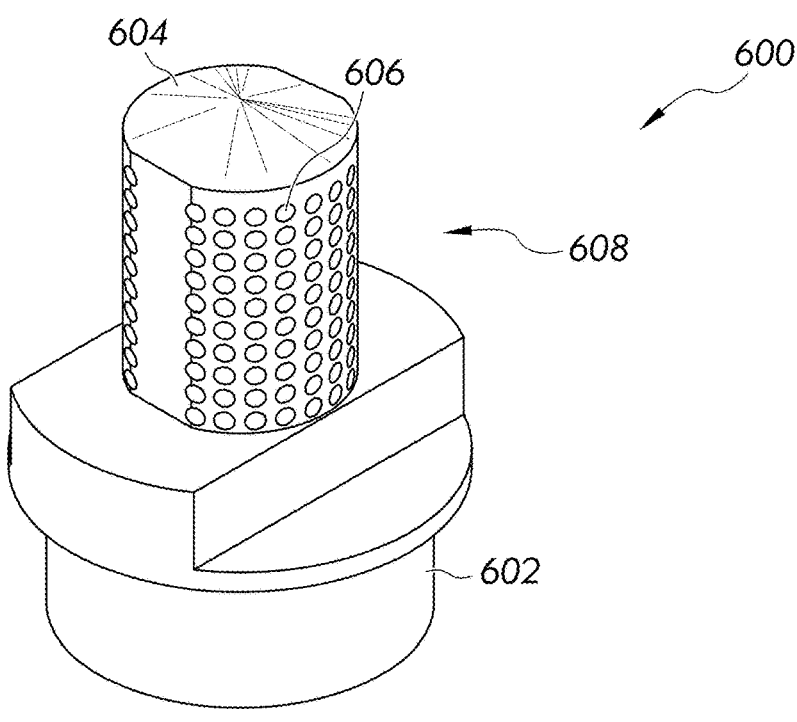
FIG. 6A schematically depicts a forming tool for use in a forming station in a process of converting a glass tube into a glass article, the forming tool comprising an array of discrete holes for providing a lubricant between the forming tool and the glass tube, according to one or more embodiments described herein.
Figure 6B:
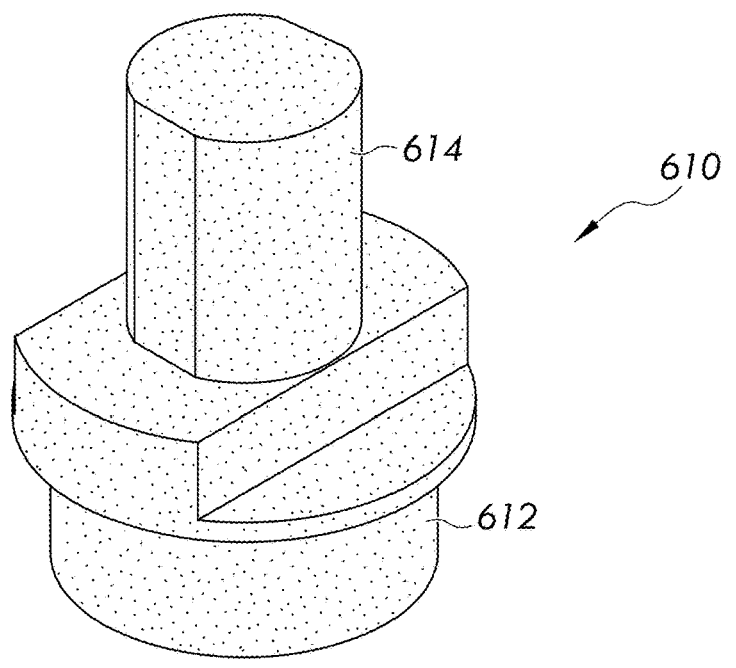
FIG. 6B schematically depicts a forming tool for use in a forming station in a process of converting a glass tube into a glass article, the forming tool being constructed of a porous material allowing lubricant to seep therethrough at the interface between the forming tool and the glass tube, according to one or more embodiments described herein.

FIG. 6A schematically depicts a forming tool 600 for use in a forming station in a process of converting a glass tube into a glass article. The forming tool 600 comprises a base portion 602 and an insertion portion 604 extending from the base portion 602. The insertion portion 604 comprises a plurality of discrete holes 606 arranged along a curved contact surface 608 thereof to facilitate forming a layer of lubricant at the interface between the insertion portion 604 and the interior surface 146 of the glass tube 102 (see FIG. 1). As shown, the plurality of discrete holes 606 substantially cover the curved contact surface 608. Such a large number of fluid openings facilitates ejection of a larger volume of lubricant over a short time period, reducing the time period required to form the lubricant layer as compared with the forming tool 500 described herein with respect to FIG. 5. Formation of such a large number of closely-spaced discrete holes 606 is facilitated by constructing the forming tool using additive manufacturing techniques, as described herein. FIG. 6B schematically depicts a forming tool 610 for use in a forming station in a process of converting a glass tube into a glass article. The forming tool 610 comprises a base portion 612 and an insertion portion 614 extending from the base portion 612. The forming tool 610 is constructed of a porous material (e.g., a carbon-based material such as graphite or a composite, brass, stainless steel, a nickel or cobalt-containing alloy, a ceramic) such that lubricant may seep through the forming tool 610. In embodiments, the lubricant may only seep through the insertion portion 614, as the base portion 612 may possess a sufficient wall thickness to contain the lubricant. Constructing the forming tool 610 of a porous material beneficially facilitates a spatially uniform distribution of lubricant being provided to the glass tube 102.

Figure 7A:
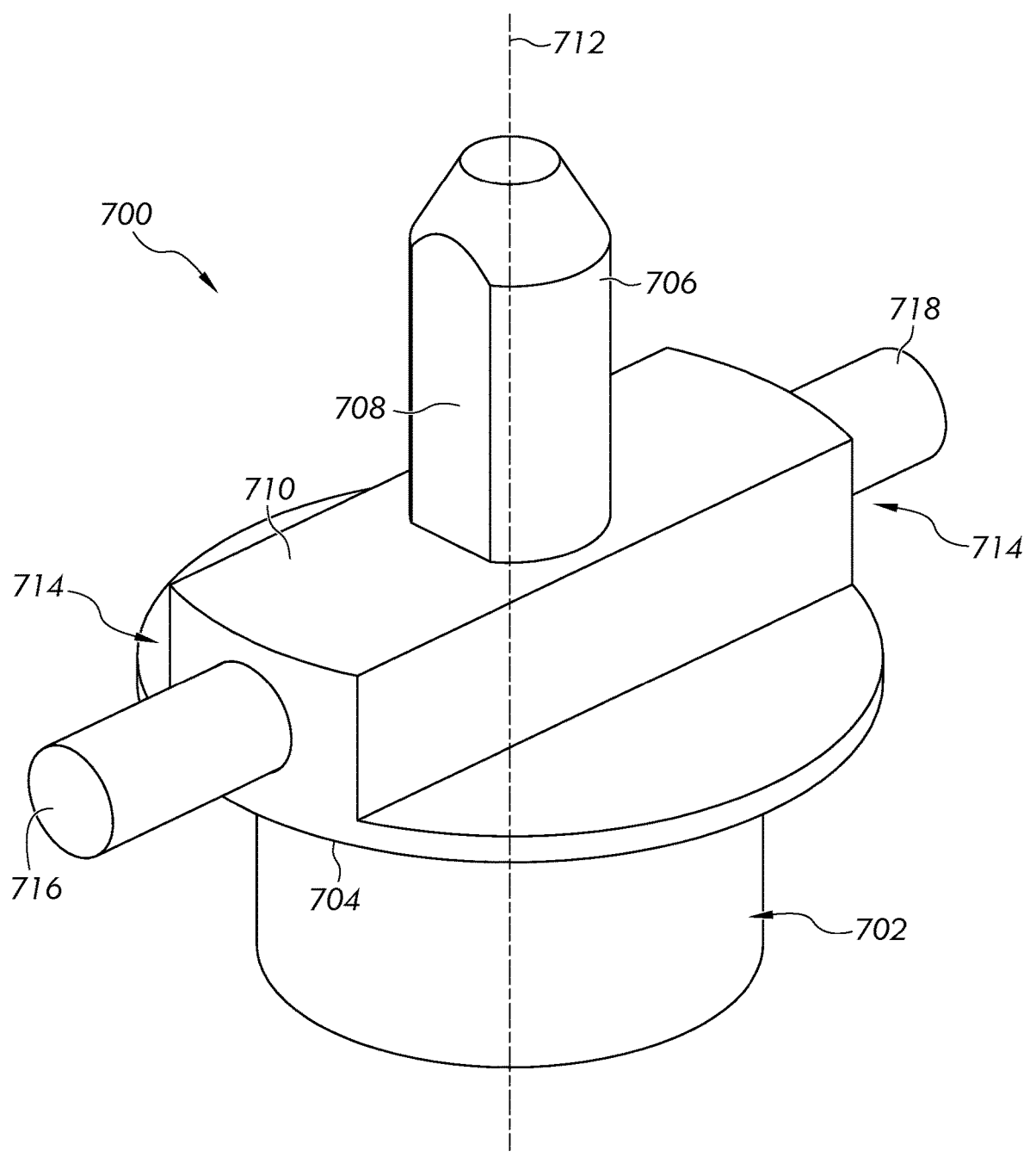
FIG. 7A schematically depicts a forming tool for use in a forming station in a process of converting a glass tube into a glass article, the forming tool comprising a thermally conductive insert extending through a main body thereof to facilitate dissipation of heat from the glass tube, according to one or more embodiments described herein.
Figure 7B:
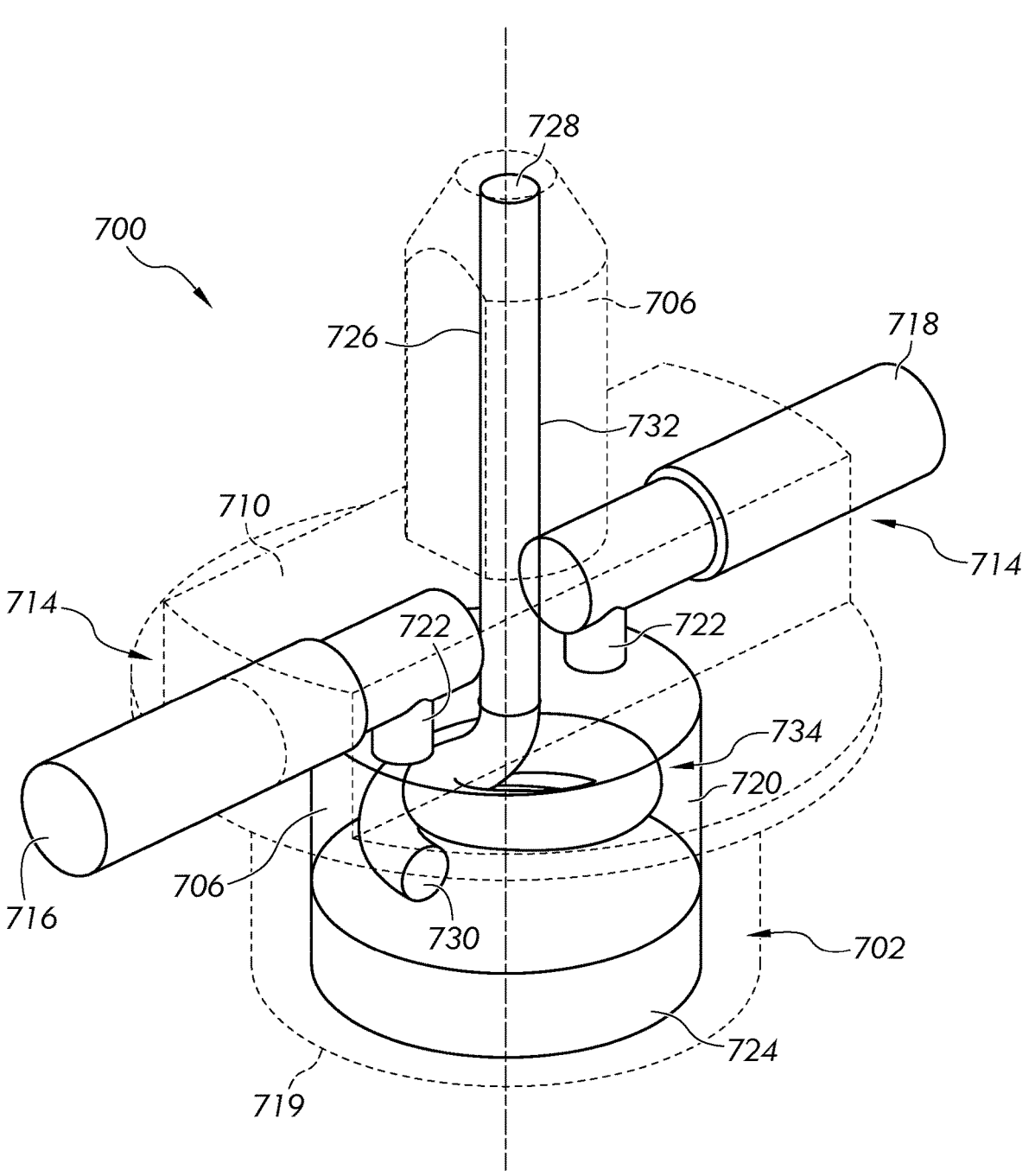
FIG. 7B schematically depicts a view of the interior of the forming tool depicted in FIG. 7A, according to one or more embodiments described herein.

FIGS. 7A and 7B schematically depict another forming tool 700 for use in a process of converting a glass tube into a glass article. In embodiments, for example, the forming tool 700 may be used in place of the forming tool 324c described herein with respect to FIG. 4D. In embodiments, the forming tool 700 is a component of the converter 100 described herein with respect to FIGS. 3-4D. FIG. 7A schematically depicts a view of the forming tool 700 including a main body 702 thereof. FIG. 7B schematically depicts a view of the interior of the forming tool (with only a dashed outline of the main body 702 being shown). As depicted in FIG. 7A, the main body 702 comprises a base portion 704 and an insertion portion 706 extending from the base portion 704. In embodiments, the base portion 704 is attached to the base 104 of the converter 100 (see FIG. 2) via a support structure (not depicted) within a forming station. The insertion portion 706 comprises an external contact surface 708 that is sized for insertion into the opening 150 in the glass tube 102 (See FIG. 1). The insertion portion 706 extends from a surface 710 of the base portion 704 and along a central axis 712 of the forming tool 700. The insertion portion 706 comprises an axial length that may vary depending on the desired shape of the glass article that the forming tool 700 is designed to form (e.g., an axial length of the shoulder 142 and/or neck 145 depicted in FIGS. 4A-4D). In embodiments, when used in the converting process, an end of the glass tube 102 may contact the surface 710 to facilitate shaping a component of the glass article being formed (e.g., the flange 144 depicted in FIGS. 4A-4D).

In embodiments, the main body 702 is constructed of stainless steel or other suitable metallic material or alloy. In the depicted embodiment, the main body 702 is a monolithic integrated body such that the base portion 704 and the insertion portion 706 are constructed of the same material. In embodiments, for example, the base portion 704 and the insertion portion 706 are machined from a single workpiece (e.g., a steel block). It should be understood that alternative embodiments are envisioned where the main body 702 comprises multiple components and/or is constructed of multiple materials. For example, in embodiments, the insertion portion 706 may be removably attached to the base portion 704 to facilitate replacement thereof in the event of damage. In embodiments, the base portion 704 is constructed of a first material and the insertion portion 706 is constructed of a second material that is different from the first material. In embodiments, the second material may be selected to have a greater heat capacity than the first material to prevent the insertion portion 706 from overheating and burning lubricant applied thereto.

As depicted in FIG. 7B, the main body 702 comprises one or more openings 714 formed therein. In the depicted embodiment, the one or more openings 714 comprise a first opening into which a coolant inlet 716 is inserted and a second opening into which coolant outlet 718 is inserted. In embodiments, the coolant inlet 716 and the coolant outlet 718 comprise conduits in fluid communication with a pressurized coolant source (not depicted). In embodiments, the coolant inlet 716 and the coolant outlet 718 are a part of the main body 702. In embodiments, the coolant inlet 716 and the coolant outlet 718 are separately formed components that are inserted into the one or more openings 714. Embodiments are also envisioned where the coolant inlet and the coolant outlet 718 are integrated into a single coolant conduit.

In embodiments, the coolant inlet 716 and the coolant outlet 718 are components of a cooling circuit comprising a pressurized coolant source (not depicted). The pressurized coolant source may comprise a pump and a coolant reservoir in fluid communication with the coolant inlet 716 and the coolant outlet 718. The coolant reservoir may contain a coolant such as water or other suitable cooling fluid (e.g., pressurized air, an inert gas). In embodiments, the coolant is pressurized via the pump, enters the forming tool 700 via the coolant inlet 716, circulates through the forming tool 700, and exits the forming tool 700 via the coolant outlet 718. In embodiments, the coolant inlet 716 and the coolant outlet 718 extend through the same opening in the main body 702. That is, embodiments are envisioned where the main body 702 comprises a single opening through which the coolant inlet 716 and coolant outlet 718 are inserted. Alternative locations for the one or more openings 714 (and therefore the points at which the coolant inlet 716 and coolant outlet 718 are connected to the main body 702) are also envisioned. For example, in embodiments, the one or more openings 714 may be disposed in a base 719 of the main body 702. In embodiments, the one or more openings 714 may be disposed on the surface 710. Embodiments are also envisioned where the forming tool comprises a plurality of coolant inlets and/or a plurality of coolant outlets.

In embodiments, the main body 702 comprises a fluid cavity 720 formed therein. The fluid cavity 720 may be in fluid communication with the coolant inlet 716 and the coolant outlet 718. For example, in the depicted embodiment, the main body 702 comprises delivery conduits 722 extending between each of the one or more openings 714 and the fluid cavity 720. Coolant delivered via the coolant inlet 716 enters the fluid cavity 720 via one of the delivery conduits 722 and exits the fluid cavity 720 via the coolant outlet 718. In embodiments, circulation of fluid within the forming tool 700 is limited to the base portion 704. That is, in embodiments, the coolant entering the forming tool 700 via the coolant inlet 716 does not enter or circulate through the insertion portion 706. Since the base portion 704 comprises a larger volume than the insertion portion 706, openings for circulating the coolant therethrough (e.g., the one or more openings 714, the delivery conduits 722) may be sized to avoid high pressure requirements for delivery of the coolant. Localizing fluid circulation through the base portion 704 beneficially reduces the required pressure for circulation of the coolant through the forming tool 700. Reduced pressure requirements may increase process safety and permit use of less expensive coolant sources (e.g., including low pressure pumps). The forming tool 700 further comprises a cap 724 delineating a boundary of the fluid cavity 720. The cap 724 may be constructed of the same material as the main body 702. In embodiments, the cap 724 is welded to an interior surface of the main body 702 to define the fluid cavity 720.

Referring still to FIG. 7B, the forming tool 700 further comprises a thermally conductive insert 726 extending through both the base portion 704 and the insertion portion 706. The thermally conductive insert 726 comprises a proximal end 728 disposed proximate to an end of the insertion portion 706 and a distal end 730 disposed in the base portion 704. In embodiments, the distal end 730 is disposed within the fluid cavity 720 such that coolant from the coolant source circulates around the distal end 730 when flowing through the fluid cavity 720. In embodiments, the thermally conductive insert 726 is constructed of a material having a thermal conductivity that is greater than that out of which the main body 702 (or insertion portion 706) is formed. In embodiments, the thermal conductivity of the thermally conductive insert 726 is greater than or equal to 300 W/m*K. In embodiments, the thermally conductive insert 726 comprises a single-piece construction and is constructed of a thermally conductive material (e.g., copper, graphite). In embodiments, the thermally conductive insert 726 comprises a wire formed of thermally conductive material. In embodiments, the thermally conductive insert 726 is press fit into an opening in the insertion portion 706 using a thermal paste for high contact conductivity between the insertion portion 706 and the thermally conductive insert 726.

In embodiments, the thermally conductive insert 726 is constructed of a thermal transfer device comprising a heat exchange medium. For example, in embodiments, the thermally conductive insert 726 comprises a heat pipe where a working fluid is heated via heat received from the glass tube 102, which causes the working fluid to evaporate and travel towards the distal end 730 to a cooled region (e.g., within the fluid cavity 720 containing circulating coolant). The working fluid may condense in the cooled region to release heat at a location displaced from the insertion portion 706 (e.g., in the base portion 704). Irrespective of the implementation, heat from the pre-heated glass travels from the insertion portion 706 through the thermally conductive insert 726 into the coolant circulating through the fluid cavity 720. The combination of the thermally conductive insert 726 and the fluid cavity 720 facilitates removal of heat from the forming tool 700 while avoiding the need to circulate fluid through the insertion portion 706. That is, heat may be removed from the insertion portion 706 without using a highly pressured coolant source.

In the depicted embodiment, the thermally conductive insert 726 comprises a linear portion 732 extending through the insertion portion 706 and a coiled portion 734 disposed in the base portion 704. The coiled portion 734 may facilitate the thermally conductive insert 726 having a greater length than if the entirety of the thermally conductive insert 726 were linear, potentially increasing the effective thermal conductivity of the thermally conductive insert 726, while limiting the axial extent of the thermally conductive insert 726. The thermally conductive insert 726 may take a variety of forms depending on the implementation. In embodiments, at least a portion of the thermally conductive insert 726 contacts the coolant circulating through the fluid cavity 720. In embodiments, at least a portion of the thermally conductive insert 726 extends through the fluid cavity 720. Embodiments are also envisioned where a portion of the thermally conductive insert 726 is disposed outside of the main body 702.

Figure 8:
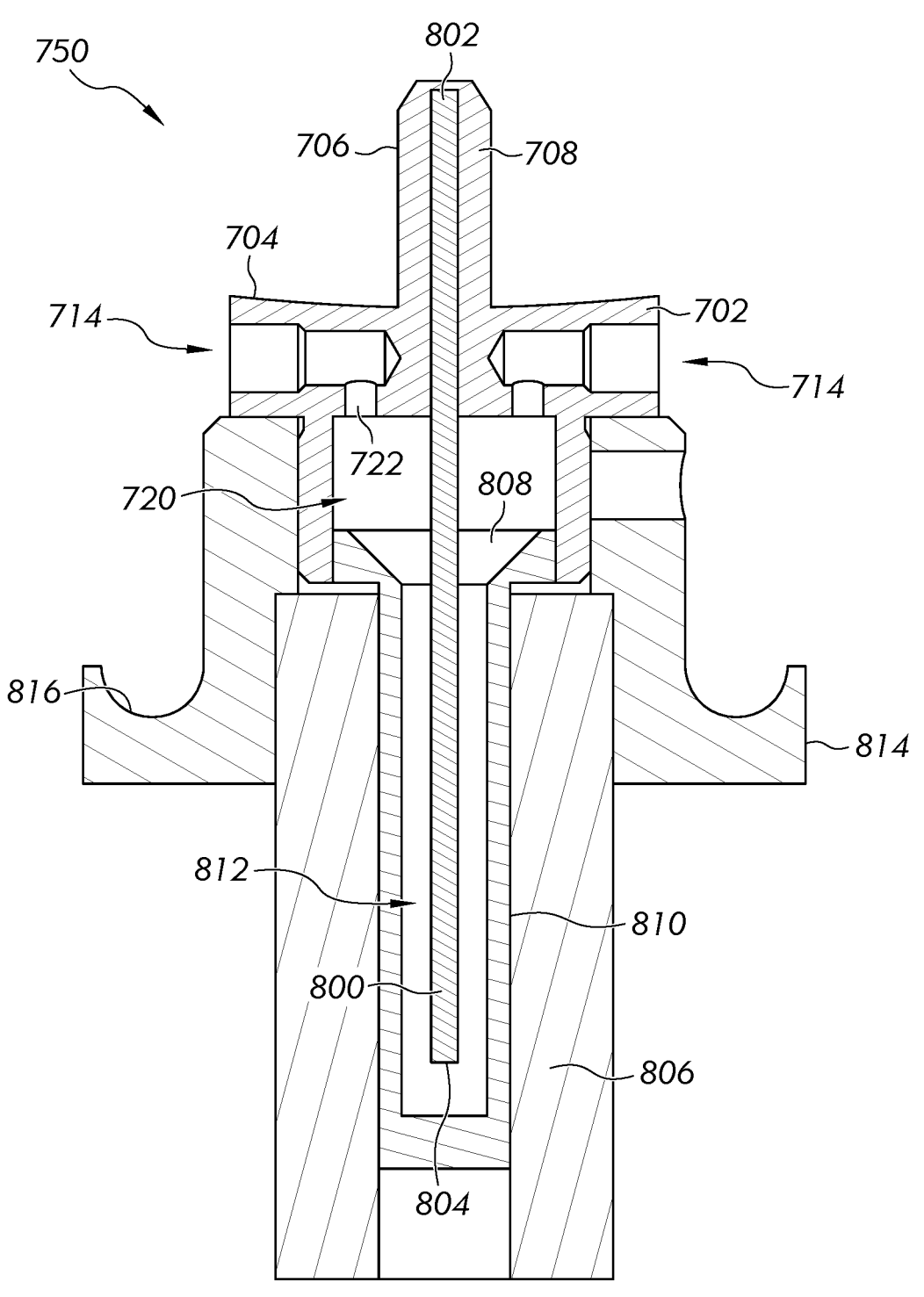
FIG. 8 schematically depicts a cross-sectional view of a forming tool for use in a forming station in a process of converting a glass tube into a glass article, the forming tool comprising a thermally conductive insert extending therethrough and a cooling circuit in which coolant from a coolant inlet is introduced into a fluid chamber of the forming tool and circulated around an end of the thermally conductive insert, according to one or more embodiments described herein.

FIG. 8 schematically depicts a cross-sectional view of a forming tool 750 that may be used in a process of converting glass tubes into glass articles. The forming tool 750 may be used in place of the forming tool 324c described herein with respect to FIG. 4D. The forming tool 750 may comprise similar components as the forming tool 700 described herein with respect to FIGS. 7A and 7B. Accordingly, like reference numerals are used in FIG. 8 to indicate the incorporation of like components. As depicted in FIG. 8, the forming tool 750 comprises the main body 702 described herein with respect to FIGS. 7A and 7B and comprises the fluid cavity 720 in fluid communication with one or more openings 714 via delivery conduits 722. The forming tool 750 comprises a thermally conductive insert 800 that differs in structure to the thermally conductive insert 726 described herein in that the forming tool 750 comprises an axial length that is greater than that of the main body 702. The thermally conductive insert 800 comprises a proximal end 802 disposed in the insertion portion 706 and a distal end 804 disposed outside of the main body 702. The thermally conductive insert 800 is substantially linear in shape and does not include a coiled portion.

As depicted in FIG. 8, the main body 702 is disposed on a support structure 806. The support structure 806 may be attached to the base 104 of a forming station of the converter 100 (see FIG. 2). A cap 808 partially extends through the base portion 704 (e.g., through an opening forming a portion of the fluid cavity 720) to seal the fluid cavity 720. The cap 808 includes an extension 810 extending in an axial direction. The extension 810 is inserted into an opening formed in the support structure 806. The extension 810 comprises cavity 812 that faces the fluid cavity 720, thereby extending the fluid cavity 720 into the support structure 806 such that the distal end 804 of the thermally conductive insert is disposed within the fluid cavity 720 despite extending outside of the main body 702.

Referring still to FIG. 8, the forming tool 750 further comprises a casing 814 extending around the base portion 704. The casing 814 comprises a conduit 816 (e.g., groove, recess, or the like) for receiving lubricant applied to the forming tool 750 during the conversion process. The forming tool 750 demonstrates how the structure of various components of the forming tools described herein may be modified to accommodate thermally conductive inserts having a variety of forms. It should be appreciated that embodiments are also envisioned where a geometry of the main body 702 may be modified to accommodate the thermally conductive insert 800 (e.g., the base portion 704 may be lengthened to eliminate the need for the extension 810 of the cap 808).

EXAMPLES

The forming tools 700 and 750 described herein with respect to FIGS. 7A, 7B, and 8 were tested using a thermal model in Fluent® software. Simulations were performed using no heat insert and various different materials for the thermally conductive inserts 726 and 800 described herein. The results for the forming tool 700 are provided below in Table 1.

TABLE 1

| Insert material | Insert heat conductance, W/m · K | Maximum Temperature at contact surface, ° C. | Average Temperature at contact surface, ° C. |
|---|---|---|---|
| copper | 398 | 219.058 | 187.724 |
| graphite | 1500 | 143.15 | 126.904 |
| heat pipe | 10000 | 102.181 | 90.953 |
| no insert | N/A | 419.458 | 334.537 |

Figure 9A:
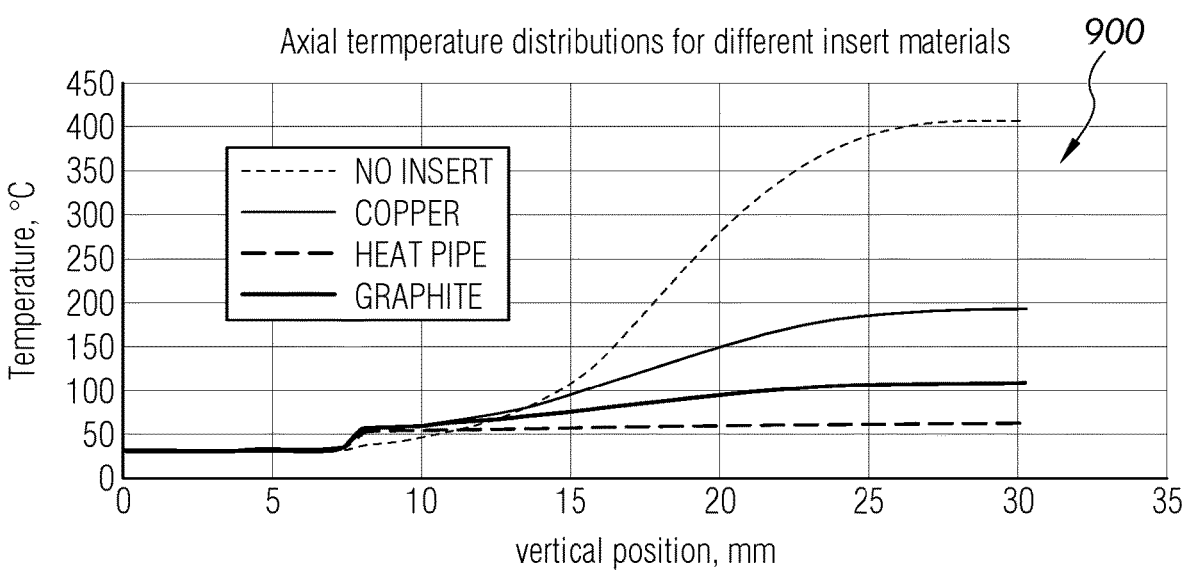
FIG. 9A depicts simulation results plotting an axial temperature distribution of the forming tool depicted in FIGS. 7A and 7B while in contact with a pre-heated glass tube, according to one or more embodiments described herein.

As shown, the presence of the thermally conductive insert 726 significantly decreases the maximum temperature and average temperature of the contact surface 708, with increased thermally conductivities providing greater temperature reductions. The graphite and heat pipe inserts reduced the maximum temperature beneath 200° C., thereby avoiding lubricant burning FIG. 9A depicts a plot 900 of the axial temperature distribution of the insertion portion 706 with the thermally conductive insert 726 being constructed of various different materials. As shown, the axial variability is significantly diminished by the presence of the thermally conductive insert 726, with the heat pipe providing the lowest axial variability of less than 50° C.

The thermal simulation results for the forming tool 750 are provided below in Table 2.

TABLE 2

| Insert material | Insert heat conductance, W/m · K | Maximum Temperature at contact surface, ° C. | Average Temperature at contact surface, ° C. |
|---|---|---|---|
| copper | 398 | 122.05 | 114.962 |
| graphite | 1500 | 86.593 | 82.545 |
| heat pipe | 10000 | 74.24 | 70.886 |
| no insert | N/A | 380.911 | 338.939 |

Figure 9B:
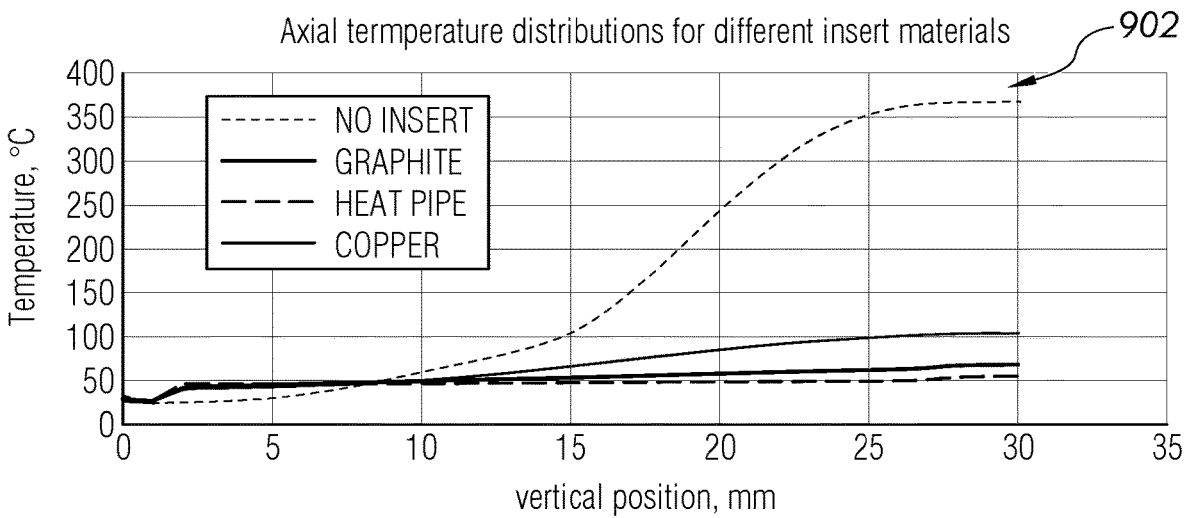
FIG. 9B depicts simulation results plotting an axial temperature distribution of the forming tool depicted in FIG. 8 while in contact with a pre-heated glass tube, according to one or more embodiments described herein.

As shown, the presence of the thermally conductive insert 800 significantly decreases the maximum temperature and average temperature of the contact surface 708, with increased thermally conductivities providing greater temperature reductions. All of the inserts reduced the maximum temperature beneath 200° C., thereby avoiding lubricant burning. FIG. 9B depicts a plot 902 of the axial temperature distribution of the insertion portion 706 with the thermally conductive insert 800 being constructed of various different materials. As shown, the axial variability is significantly diminished by the presence of the thermally conductive insert 800, with the heat pipe providing the lowest axial variability of less than 50° C.

In these examples, the thermally conductive insert 726 possessed the same length as the thermally conductive insert 800. The forming tool 750 appears to perform slightly better than the forming tool 700. Without wishing to be bound by theory, it is believed the larger volume of coolant flow provided by the extension 810 of the cap 808 facilitates greater heat transfer.

While the preceding examples described forming tools with fluid cavities functioning either as lubricant delivery conduits or for coolant circulation, it should be understood that embodiments are also envisioned where the fluid cavities perform both of such functions simultaneously. For example, in embodiments, forming tools may include a fluid cavity similar to the fluid cavity 520 described herein, at least one fluid opening similar to the one or more fluid openings 516 described herein, and a thermally conductive insert extending through the fluid cavity 520 (e.g., such that the thermally conductive insert is immersed in the lubricant). Embodiments are also envisioned where the forming tools include multiple coolant cavities, with each coolant cavity performing one of the functions described herein. For example, embodiments are envisioned where a first fluid cavity is disposed in an insertion portion for delivery of lubricant therethrough and a second fluid cavity is disposed in the base portion for coolant circulation around a thermally conductive insert. In such embodiments, the thermally conductive insert may extend through both of such coolant cavities or only a single coolant cavity. As such, while the thermally conductive insert and the fluid openings for lubricant delivery have been described as mutually exclusive in the preceding examples, embodiments are envisioned where such aspects of the present disclosure are incorporated together.

In view of the foregoing, it should be appreciated that improved forming tools for use in converting glass tubes into glass articles have been described. The forming tools described herein may include one or more fluid openings for provision of lubricant from a fluid cavity to an interface between the forming tools and the glass tubes, thereby ensuring slippage when the forming tools and the glass tubes are moved (e.g., rotated) relative to one another. Alternatively or additionally, the forming tools described herein may include thermally conductive inserts extending therethrough to facilitate heat removal from the interface between the forming tubes and the glass tubes. Such heat may be removed from the forming tools by circulating a coolant around the thermally conductive insert to maintain contact surfaces of the forming tools beneath a lubricant burning temperature (e.g., less than or equal to 200° C.). By providing adequate lubrication and/or cooling, the forming tool designs described herein beneficially avoid the formation of defects in the resultant glass articles, thereby improving production yields while decreasing part production times by avoiding lubrication and cooling pauses in the conversion process.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A forming tool for use during a process of converting a glass tube into a glass container, the forming tool comprising:

a base portion comprising a fluid cavity for containing a fluid;

an insertion portion extending from the base portion, the insertion portion comprising an external surface sized to fit into an opening of the glass tube; a thermally conductive insert extending through the base portion and the insertion portion, wherein the thermally conductive insert comprises a linear portion extending through the insertion portion and a coiled portion disposed in the base portion the thermally conductive insert and having a thermal conductivity that is greater than that of a material out of which the insertion portion is formed, the thermally conductive insert extending through the fluid cavity, a coolant circulating through the fluid cavity such that the coolant regulates a temperature of the thermally conductive insert, wherein a central axis of the forming tool extends through at least a portion of the thermally conductive insert; and a coolant source;

a coolant inlet in fluid communication with the coolant source and the fluid cavity;

a coolant outlet on the external surface of the insertion portion, wherein coolant from the coolant source enters the fluid cavity via the coolant inlet, circulates around the thermally conductive insert, and exits the forming tool via the coolant outlet to remove heat from the forming tool; and

the coolant comprises a lubricant forming a film between the insertion portion and the glass tube.

2. The forming tool of claim 1, wherein:

the thermally conductive insert comprises a proximal end disposed in the insertion portion and a distal end disposed in the base portion, and the fluid cavity extends around the distal end such that the coolant circulates around the distal end and at least a portion of a central region of the thermally conductive insert extending between the proximal end and the distal end.

3. The forming tool of claim 1, further comprising a second forming tool configured for insertion into the opening of the glass tube, wherein, when the first forming tool is in the forming position, the glass tube is pressed between the first and second forming tools and the drive mechanism rotates the holder such that the glass tube rotates as the glass tube is pressed between the first and second forming tools to form a portion of the glass container extending around a circumference of the glass tube.

4. The apparatus of claim 3, wherein:

the forming station is disposed on a base;

the apparatus further comprises a main turret that is rotatable about a central axis relative to the base; and the holder is attached to the main turret such that rotation of the main turret positions the glass tube in alignment with the forming station.

5. The apparatus of claim 4, further comprising a plurality of processing stations disposed on the base, the plurality of processing stations arranged in a main circuit comprising a heating station heating the glass tube prior to the glass tube entering the forming station.

6. The apparatus of claim 5, wherein the plurality of processing stations comprises a second forming station positioned in the main circuit after the forming station, the second forming station comprising a third forming tool sized for insertion into the opening of the glass tube, wherein a tolerance between an external surface of the third forming tool and the opening of the glass tube is less than a tolerance between the external surface of the second forming tool and the opening of the glass tube.

* * * * *